(12) United States Patent
Shimizu et al.

(10) Patent No.: US 8,654,297 B2
(45) Date of Patent: Feb. 18, 2014

(54) LIQUID CRYSTAL DISPLAY DEVICE

(75) Inventors: Masahiro Shimizu, Osaka (JP); Takashi Katayama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 198 days.

(21) Appl. No.: 12/999,024

(22) PCT Filed: Mar. 18, 2009

(86) PCT No.: PCT/JP2009/055281
§ 371 (c)(1),
(2), (4) Date: Dec. 14, 2010

(87) PCT Pub. No.: WO2010/001642
PCT Pub. Date: Jan. 7, 2010

(65) Prior Publication Data
US 2011/0109864 A1    May 12, 2011

(30) Foreign Application Priority Data

Jun. 30, 2008 (JP) .................................. 2008-171223

(51) Int. Cl.
*G02F 1/1343* (2006.01)
*G02F 1/139* (2006.01)

(52) U.S. Cl.
USPC .......................................... 349/143; 349/177

(58) Field of Classification Search
USPC ............ 349/37, 143, 146, 176, 38, 144, 177; 345/87, 92, 96
See application file for complete search history.

(56) References Cited

U.S. PATENT DOCUMENTS

| | | |
|---|---|---|
| 6,671,009 B1 | 12/2003 | Hattori et al. |
| 2003/0001809 A1 | 1/2003 | Hattori |
| 2004/0160396 A1 | 8/2004 | Hattori et al. |
| 2005/0052399 A1 | 3/2005 | Hattori |
| 2006/0028601 A1* | 2/2006 | Kawahara et al. ............ 349/117 |
| 2006/0203171 A1 | 9/2006 | Ozawa |
| 2006/0244701 A1* | 11/2006 | Fukui .............................. 345/87 |
| 2007/0182875 A1* | 8/2007 | Kim et al. ........................ 349/44 |
| 2007/0273634 A1 | 11/2007 | Fukami |
| 2009/0051841 A1 | 2/2009 | Shimizu |

FOREIGN PATENT DOCUMENTS

| | | |
|---|---|---|
| JP | 2002-250942 | 9/2002 |
| JP | 2006-251605 | 9/2006 |
| JP | 2007-316387 | 12/2007 |
| WO | 2007/091346 | 8/2007 |

OTHER PUBLICATIONS

International Search Report for PCT/JP2009/055281, mailed Apr. 28, 2009.

* cited by examiner

*Primary Examiner* — Dung Nguyen
*Assistant Examiner* — Tai Duong
(74) *Attorney, Agent, or Firm* — Nixon & Vanderhye P.C.

(57) ABSTRACT

What is provided is an OCB mode liquid crystal display device (10), including: a plurality of gate bus lines (40); a plurality of source bus lines (42); pixels (58); and pixel electrodes (60) corresponding to the respective pixels (58). According to the OCB mode liquid crystal display device (10), a gap width (L22) between adjacent ones of the pixel electrodes (60) is wider at intersections (S30) of the plurality of gate bus lines (40) and the plurality of source bus lines (42) than in areas other than the intersections (S30).

6 Claims, 11 Drawing Sheets

LIQUID CRYSTAL DISPLAY DEVICE

This application is the U.S. national phase of International Application No. PCT/JP2009/055281, filed Mar. 18 2009, which designated the U.S. and claims priority to Japanese Patent Application No. 2008-171223, filed Jun. 30 2008, the entire contents of each of which are hereby incorporated by reference.

TECHNICAL FIELDS

The present invention relates to an OCB (Optically Self-Compensated Birefringence) mode liquid crystal display device.

BACKGROUND ART

Conventionally, a liquid crystal display device has been used in a variety of electronic devices such as a television set, a laptop computer, a desktop personal computer, a PDA (personal digital assistant: a mobile terminal), and a mobile phone. The liquid crystal display device has the advantages that it (i) is thinner and lighter than a CRT (Cathode Ray Tube) display device and (ii) consumes less electric power than the CRT (Cathode Ray Tube) display device because the liquid crystal display device can be driven by a lower voltage than the CRT (Cathode Ray Tube) display device.

Particularly, a liquid crystal display device employing TFT (Thin Film Transistor) elements (such a liquid crystal display device is called a TFT liquid crystal display device) achieves high display quality, because all pixels are switched over via respective TFT elements.

Meanwhile, it has become rapidly widespread in an electronic device such as a television receiver that a moving image is displayed by such a liquid crystal display device. Accordingly, the liquid crystal display device has been required to further increase a response speed of a liquid crystal display panel so as to achieve a moving image with higher quality.

In view of the circumstances, an OCB mode liquid crystal display device has particularly attracted attention recently. The OCB mode liquid crystal display device is generally configured such that: a liquid crystal layer is provided between two substrates which have been subjected to an alignment treatment so as to cause liquid crystal molecules to be aligned in a same direction in parallel with one another; wave plates are provided on surfaces of the respective two substrates; and polarization plates are further provided on the respective wave plates so that the polarization plates are in a crossed Nicols relation.

(Reverse Transition)

In a case where the OCB mode is employed in for example a normally white mode (NW mode), in which a black display is carried out while a high voltage is being applied and a white display is carried out while a low voltage is being applied, a voltage applied to the liquid crystal layer needs to be reduced to nearly a critical voltage (Vcr) between splay and bend orientations so that a white display is achieved with high transmittance.

Because of this, a bend-splay transition (reverse transition) sometimes occurs while the white display is being carried out, which allows a display to be no longer properly carried out. Note that the bend-splay transition here means a phenomenon of the liquid crystal molecules, which once have been in a bend orientation state, again returning into a splay orientation state.

The reverse transition occurs even while the drive is being carried out by a voltage equal to or higher than the critical voltage (Vcr). In a case where the liquid crystal display device is the TFT liquid crystal display device, the reverse transition may occur in gaps between pixel electrodes, which gaps are above a gate bus line and above a source bus line. If the reverse transition occurs, a region above the gate bus line and a region above the source bus line, in which regions the liquid crystal molecules are in a splay orientation state (such regions are hereinafter referred to as splay orientation regions), are likely to merge together.

If the splay orientation regions merge together, the play splay orientation regions thus merged may spread into a display region while the white display is being carried out. This causes a display defect.

(High White Voltage)

In order to prevent the reverse transition, there have been proposed a variety of methods.

One of the methods is to increase a voltage, which is applied while the white display is being carried out in the normally white mode (such a voltage is called a white voltage), to a voltage sufficiently higher than the critical voltage (Vcr).

However, with this method of increasing the white voltage, it was difficult to achieve an OCB panel with high brightness, because of trade-off between the white voltage and brightness.

(Black Insertion)

There has been proposed, as another method for preventing the reverse transition, a method in which a signal is applied separately from an image signal so as to prevent a reverse transition.

Specifically, for example, there has been proposed a method of stably maintaining a bend orientation by inserting a black display once or more times per frame of each display image.

However, according to the method of inserting the black display, there has been a problem that white brightness decreases as is the case with the method of increasing the white voltage.

Further, according to the method of inserting the black display, there has been another problem that flicker occurs.

(Patent Literature 1)

Patent Literature 1 discloses a configuration in which salient parts are provided in peripheral parts of pixels so as to allow all the liquid crystal molecules to efficiently transit into the bend orientation state. The salient parts are in a plane parallel with a surface of a substrate. This is described below with reference to a drawing.

FIG. 12 schematically illustrates how a liquid crystal display device 100 disclosed in Patent Literature 1 is configured. As illustrated in FIG. 12, the liquid crystal display device 100 disclosed in Patent Literature 1 includes (i) a plurality of signal electrode lines 106 and (ii) a plurality of gage electrode lines 107 substantially orthogonal to the plurality of signal electrode lines 106.

The plurality of electrode lines 106 and the plurality of gate electrode lines 107 substantially define pixel regions, in each of which a pixel electrode 102 having a substantially rectangular shape is provided. The pixel electrode 102 has a switching transistor 108, which is provided in the vicinity of corresponding one of intersections of the plurality of signal electrode lines 106 and the plurality of gate electrode lines 107.

According to such a liquid crystal display device 100 disclosed in Patent Literature 1, the plurality of signal electrode lines 106 have salient parts 161. Meanwhile, the pixel electrode 102 has, in a portion facing corresponding one of the salient parts 161, a reentrant part 121 which is in a shape corresponding to the shape of the salient part 161.

The pixel electrode 102 also has a salient part 122, which has a shape identical to that of the salient part 161 of one signal electrode line 106 which corresponds to the pixel electrode 102. Meanwhile, the other signal electrode line 106 which corresponds to the pixel electrode 102 has, in a portion facing the salient part 122, a reentrant part 162 which is in a shape corresponding to the shape of the salient part 122.

Patent Literature 1 teaches that this configuration makes it possible to allow all the liquid crystal molecules to efficiently transit into the bend orientation state.

Patent Literature 1

Japanese Patent Application Publication, Tokukai, No. 2002-250942 A (Publication Date: Sep. 6, 2002)

SUMMARY OF INVENTION

However, the conventional liquid crystal display device as above has a problem that the reverse transition cannot be sufficiently prevented.

Specifically, Patent Literature 1 teaches that, according to the liquid crystal display device 100, transverse electric fields are generated in the vicinities of the salient parts 122 and 161 and the reentrant parts 121 and 162. The transverse electric fields serve as cores from which splay-bend transition spreads, thereby completing the splay-bend transition in a relatively short period of time. However, according to the liquid crystal display device 100, it is difficult to sufficiently prevent the reverse transition for example while an actual display is being carried out after the splay-bend transition is completed. This is described below with reference to the drawings.

(Configuration of OCB Panel)

The following description discusses, with reference to (a) and (b) of FIG. 13, how the OCB mode liquid crystal display device is schematically configured and how liquid crystal molecules are oriented in the OCB mode liquid crystal display device.

(a) and (b) of FIG. 13 are cross-sectional views each schematically illustrating how an OCB mode liquid crystal display device 10 is configured. (a) of FIG. 13 illustrates how liquid crystal molecules 52 are aligned when no voltage is applied. (b) of FIG. 13 illustrates how the liquid crystal molecules 52 are oriented while a voltage is being applied.

The liquid crystal display device 10 includes, as illustrated in (a) and (b) of FIG. 13, (i) a first substrate 20, (ii) a second substrate 30, and (iii) a liquid crystal layer 50 which contains the liquid crystal molecules 52. The liquid crystal layer 50 is sandwiched between the first substrate 20 and the second substrate 30.

Specifically, on the first substrate 20, there are provided: wire layers 22 which include bus lines and switching elements etc.; an insulation layer 24; pixel electrodes 60; and a first alignment film 26. Such a first substrate 20 serves as a TFT substrate (active matrix substrate).

On the other hand, on the second substrate 30, there are provided: a color filter 32, a counter electrode 34, and a second alignment film 36. Such a second substrate 30 serves as a counter substrate.

On a surface of the first substrate 20 opposite to a surface on which the wire layers 22 are provided, there are provided a first optical compensation film (wave plate) 54 and a first polarization plate 55. On a surface of the second substrate 30 opposite to a surface on which the color filter 32 is provided, there are provided a second optical compensation film (wave plate) 56 and a second polarization plate 57.

More specifically, the first alignment film 26 and the second alignment film 36 have been subjected to an alignment treatment by rubbing (i.e., rubbing alignment treatment). As described later, this alignment treatment is carried out by rubbing, in an identical direction, surfaces of two substrates which face each other (the TFT substrate and the counter substrate). In this way, the liquid crystal molecules 52 are caused to be (i) in a splay orientation state when no voltage is applied and (ii) in a bend orientation state while a voltage is being applied.

Further, the polarization plates attached to respective surfaces of the first substrate 20 and the second substrate 30, i.e., the first polarization plate 55 and the second polarization plate 57, are provided so that (i) a transmission axis of the first polarization plate 55 is at an angle of 45 degrees with respect to an alignment direction in which the liquid crystal molecules 52 on the first substrate 20 are aligned (i.e., with respect to a direction in which the rubbing alignment treatment is carried out) and (ii) a transmission axis of the second polarization plate 57 is at an angle of 135 degrees with respect to an alignment direction in which the liquid crystal molecules 52 on the second substrate 30 are aligned (i.e., with respect to the direction in which the rubbing alignment treatment is carried out). That is, the first polarization plate 55 and the second polarization plate 57 are provided in such a way that their transmission axes are in a crossed Nicols relation.

The liquid crystal molecules 52 used in the liquid crystal layer 50 generally have positive dielectric anisotropy. As used herein, the liquid crystal molecules 52 which have the positive dielectric anisotropy intend to the ones that have a characteristic in which they are oriented so that their longitudinal axes are in parallel with an electric field while a voltage is being applied to the liquid crystal molecules 52.

The first substrate 20 and the second substrate 30 are combined via spherical spacers or columnar spacers (not illustrated).

(Orientation of Liquid Crystal Molecules)

The following description specifically discusses how the liquid crystal molecules are oriented in the OCB liquid crystal display device. According to the OCB mode liquid crystal display device 10, the liquid crystal molecules 52 are in a splay orientation state (see (a) of FIG. 13) when no voltage is applied. Such liquid crystal molecules 52 are caused to be in a bend orientation state (see (b) of FIG. 13) when a voltage is applied. This process of transition from the splay orientation state into the bend orientation state is the splay-bend transition. A display is carried out by changing a tilting angle of each or the liquid crystal molecules 52 during the bend orientation state.

More specifically, as illustrated in (a) of FIG. 13, the liquid crystal molecules 52 that have just been injected are in the splay orientation state (initial orientation state), in which the liquid crystal molecules 52 are substantially parallel with the first substrate 20 and with the second substrate 30. The transition of the state of the liquid crystal molecules 2 from the splay orientation state into the bend orientation state is generally caused by applying a voltage to the liquid crystal molecules 52. Specifically, the liquid crystal molecules 52 that are in the splay orientation state try to orient so as to be perpendicular to the first substrate 20 and the second substrate 30, when a relatively high voltage (e.g., 25 V) is applied to the liquid crystal molecules 52. In other words, the liquid crystal molecules 52 here try to orient so as to be close to 90 degrees with respect to the first and second substrates 20 and 30. As a result, the transition from the splay orientation state into the bend orientation state occurs, thereby causing the liquid crystal molecules 52 in a display surface to be sequentially put in the bend orientation state (see (b) of FIG. 13).

Meanwhile, as described earlier, the OCB mode liquid crystal display device 10 carries out an actual display during the bend orientation state. Therefore, the splay-bend transition must be carried out every time the liquid crystal display device 10 is powered on.

Further, the liquid crystal display device 10 includes, in order for the liquid crystal display layer 50 to be driven in an active matrix manner, thin film transistor (TFT) elements in respective pixels. The TFT elements serve as switching elements. Each of the TFT elements is connected with a corresponding gate bus line and a corresponding source bus line. The arrangement of these constituents are described later.

(Actual Display)

As described above, the actual display is carried out after completion of the splay-bend transition. That is, the actual display is carried out during the bend orientation state. Generally, a TFT liquid crystal display device employs, in order to carry out a display, a line inversion driving or dot inversion driving each of which uses the TFT elements. FIG. 14 is a cross-sectional view, of a liquid crystal display device, illustrating how liquid crystal molecules are oriented while a display is being carried out.

As illustrated in FIG. 14, the liquid crystal molecules 52 are in the bend orientation state while a display is being carried out. A tilting angle of each of the liquid crystal molecules 52 during the bend orientation state is changed in accordance with a voltage applied to the liquid crystal molecules 52.

For example, according to FIG. 14, liquid crystal molecules 52 corresponding to a pixel electrode 60a are receiving a voltage that is a difference between an electric potential V1 of the pixel electrode 60a and an electric potential Vcom of the counter electrode 34.

On the other hand, liquid crystal molecules 52 corresponding to a pixel electrode 60b are receiving a voltage that is a difference between an electric potential V2 of the pixel electrode 60b and an electric potential Vcom of the counter electrode 34.

(Transverse Electric field)

In a case where adjacent ones of the pixel electrodes 60 have respective different electric potentials, a transverse electric field is generated between the adjacent pixel electrodes 60.

Specifically, according to an example illustrated in FIG. 14, the electric potential V1 and the electric potential V2 are different from each other by (V1−V2). Because of the difference (V1−V2), a transverse electric field is generated between the pixel electrode 60a and the pixel electrode 60b (such a transverse electric field is hereinafter referred to as an interpixel transverse electric field).

The interpixel transverse electric field is generated not only between pixel electrodes 60 adjacent to each other across a gate bus line, but also between pixel electrodes 60 adjacent to each other across a source bus line. This is described below with reference to the drawings.

(Arrangement of Pixels)

FIG. 15 illustrates how pixels and wires are arranged in the liquid crystal display device 10, which is driven in the active matrix manner by using TFT elements.

As illustrated in FIG. 15, the liquid crystal display device 10 includes a plurality of gate bus lines 40 and a plurality of source bus lines 42, which are provided in a lattice pattern.

Specifically, the plurality of gate bus lines 40 extend along a lateral direction (i.e., a direction indicated by a two-headed arrow X in FIG. 15) of the liquid crystal display device 10. On the other hand, the plurality of source bus lines 42 extend along a longitudinal direction (i.e., a direction indicated by a two-headed arrow Y in FIG. 15) of the liquid crystal display device, which direction is orthogonal to the direction indicated by the two-headed arrow X.

The plurality of gate bus lines 40 and the plurality of source bus lines 42 define regions each of which is in a substantially rectangular shape. The regions serve as pixels 58, which are provided with the respective pixel electrodes 60.

As described earlier, adjacent ones of the pixel electrodes 60 may have respective different electric potentials while a display is being carried out by the liquid crystal display device 10. Such pixel electrodes 60 which have respective different electric potentials may be adjacent to each other across corresponding one of the plurality of gate bus lines 40, or may be adjacent to each other across corresponding one of the plurality of source bus lines 42.

In the case where an electric potential is different between pixel electrodes 60 adjacent to each other across corresponding one of the wire layers 22 such as for example the plurality of gate bus lines 40 or the plurality of source bus lines 42, the interpixel transverse electric field as illustrated in FIG. 14 is generated between the adjacent pixel electrodes 60 (see a dotted arrow A in FIG. 14).

The interpixel transverse electric field is likely to induce the spray orientation, particularly in a case where the liquid crystal molecules 52 have positive dielectric anisotropy.

That is, the liquid crystal molecules are likely to be oriented in such a way that their longitudinal axes are in parallel with an electric field, in the case where the liquid crystal molecules 52 have positive dielectric anisotropy. Accordingly, the liquid crystal molecules 52 become likely to be oriented, due to the interpixel transverse electric field, in such a way that their longitudinal axes are in parallel with the first substrate 20. As a result, the reverse transition from the bend orientation state into the splay orientation state becomes more likely to occur.

(Spread into Display Region)

The splay orientation thus occurred above the wire layer 22 may spread into a display region. This is described below with reference to FIG. 15.

FIG. 15 illustrates the liquid crystal display device 10, in which there are (i) regions R5 each of which is defined by pixel electrodes 60 adjacent to each other across corresponding one of the plurality of gate bus lines 40 (such a region is hereinafter referred to as an inter-electrode region) and inter-electrode regions R5 each of which is defined by pixel electrodes 60 adjacent to each other across corresponding one of the plurality of source bus lines 42. In such a liquid crystal display device 10, there are (a) an inter-electrode region R51 in which no reverse transition is occurring and (b) an inter-electrode region R52 in which the reverse transition is occurring.

In the above configuration, (i) part of the inter-electrode region R52 in which part the reverse transition is occurring above corresponding one of the plurality of gate bus lines 40 overlaps (ii) another part of the inter-electrode region R52 in which part the reverse transition is occurring above corresponding one of the plurality of source bus lines 42. The overlap occurs in an intersection between the gate bus line 40 and the source bus line 42, and an area of the overlap in the intersection is referred to as a region R10.

In the region 10, which is the overlap of splay orientation regions (where the splay orientation is occurring due to the reverse transition), the splay orientation regions are likely to merge together due to surface tension etc. The splay orientation regions thus merged spread, particularly while a white display is being carried out in the normally white mode, into a display region R20 which is equivalent to one of the pixels 58.

As a result, the occurrence of the reverse transition conventionally becomes recognizable to a primary viewer of the liquid crystal display device 10, thereby causing a display defect.

The present invention has been made in view of the above problems, and an object of the present invention is to provide a liquid crystal display device which is capable of preventing occurrence and spread of the reverse transition, thereby preventing a deterioration in display quality.

In particular, an object of the present invention is to provide an active matrix liquid crystal display device, which is capable of preventing a deterioration in display quality by preventing the reverse transition from spreading outward from an intersection of bus lines.

In order to attain the above object, a liquid crystal display device of the present invention is an OCB mode liquid crystal display device, including: a first substrate; a second substrate; a liquid crystal layer sandwiched and sealed between the first substrate and the second substrate; and pixels arrayed in matrix, the first substrate being provided with: a plurality of gate bus lines, a plurality of source bus lines which intersect the plurality of gate bus lines, a plurality of switching elements each of which is electrically connected with corresponding one of the plurality of gate bus lines and with corresponding one of the plurality of source bus lines, and pixel electrodes which correspond to the respective pixels and are electrically connected with the respective switching elements, the second substrate being provided with a counter electrode, the liquid crystal layer containing liquid crystal molecules, which are in a splay orientation state while no voltage is applied to the liquid crystal layer and are caused to be in a bend orientation state when a voltage is applied to the liquid crystal layer, and adjacent ones of the pixel electrodes having a gap therebetween, the gap being wider at intersections of the plurality of gate bus lines and the plurality of source bus lines than in areas other than the intersections.

According to this configuration, the gap between adjacent ones of the pixel electrodes is wider at the intersections of the plurality of gate bus lines and the plurality of source bus lines. Accordingly, it is difficult that a splay orientation region, which has been generated in the gap between adjacent ones of the pixel electrodes due to reverse transition, spreads into the pixels.

That is, in the gap between adjacent ones of the pixel electrodes, a so-called transverse electric field may be generated due to for example a difference between electric potentials of adjacent ones of the pixel electrodes. Under such circumstances, the spray orientation region is likely to be generated in the gap between adjacent ones of the pixel electrodes due to the reverse transition, particularly in a case where a foreign member or the like exists in the gap between adjacent ones of the pixel electrodes.

Due to the effect of the transverse electric field etc., the splay orientation region thus generated extends along the gap between adjacent ones of the pixel electrodes. In this way, the splay orientation region increases its area size.

Note here that, in a case where the pixel electrodes are arrayed in matrix, the gap between adjacent ones of the pixel electrodes also constitutes a matrix.

Therefore, in a case where splay orientation regions (i) are generated in gaps which are along respective different directions and (ii) extend along the respective gaps, the splay orientation regions overlap each other in an intersection of the gaps. Specifically, a splay orientation region above a gate bus line and a splay (spray) orientation region above a source bus line overlap each other in an intersection of the gate bus line and the source bus line.

The spray orientation regions thus extended from the respective different directions and overlapped each other spread beyond the gaps into the pixels. The spread of the spray orientation regions into the pixels will lead to a deterioration in display quality of the liquid crystal display device.

In this regard, according to the above configuration, the gap between adjacent ones of the pixel electrodes is wider at the intersections of the plurality of gate bus lines and the plurality of source bus lines.

Accordingly, the spray orientation region which extends along the gate bus line or along the gate bus line stops extending at the intersection at which the gap is wider. Therefore, the spray orientation region which extends along the gate bus line and the spray orientation region which extends along the source bus line become less likely to overlap each other.

This prevents the spread of the spray orientation region, thereby making it more difficult for the spray orientation region to spread into the pixels.

As described above, the liquid crystal display device configured as above makes it possible to prevent a deterioration in display quality, which deterioration is caused by the occurrence and spread of the reverse transition.

In particular, it is possible, in an active matrix liquid crystal display device, to prevent a deterioration in display quality by preventing the spread of the reverse transition from the intersection of the bus lines.

The liquid crystal display device of the present invention can be configured such that the pixels are rectangular-shaped regions defined by the plurality of gate bus lines and the plurality of source bus lines; each of the pixel electrodes corresponding to the respective pixels has at least one missing portion which corresponds to a corner of the rectangular-shaped region; and the at least one missing portion makes the gap between adjacent ones of the pixel electrodes wider at the intersections.

According to this configuration, it is possible to easily make the gap between the pixel electrodes wider by providing the missing portion in each of the pixel electrodes.

The liquid crystal display device of the present invention can be configured such that each of the pixel electrodes has a missing portion corresponding to a central area of at least one of sides of corresponding one of the rectangular-shaped regions of the pixels.

The liquid crystal display device of the present invention can be configured such that the at least one missing portion is in a quadrangular shape.

According to this configuration, the missing portion is in the quadrangular shape. Therefore, it is possible to make the gap between adjacent ones of the pixel electrodes wider in greater part.

The liquid crystal display device of the present invention can be configured such that the at least one missing portion is in a triangular shape.

According to this configuration, it is possible to make the gap between adjacent ones of the pixel electrodes wider in some areas while keeping area size of the missing portion small.

This keeps reduction in the aperture ratio small, thereby making it possible to achieve a liquid crystal display device capable of carrying out a display with higher brightness.

Further, in a case where a direction of a rubbing alignment treatment given to the liquid crystal display device is for example diagonal to (at an angle of 45 degrees with respect to)

arrays of the pixels, the missing portion in the triangular shape provides the following effect. That is, the missing portion in the triangular shape makes it easy for an end surface (resulting from the missing portion) of each of the pixel electrodes to be parallel with the direction of the rubbing alignment treatment.

This makes it easy to cause the direction of the transverse electric field, which is generated in the gap between adjacent ones of the pixel electrodes, to be orthogonal to the direction of the rubbing alignment treatment.

Accordingly, it is possible to prevent the spray orientation region from being generated and spreading due to the transverse electric field.

The reason thereof is as follows. In a case where the transverse electric field is at an angle of approximately 90 degrees with respect to the direction of the rubbing alignment treatment, twist orientation is likely to occur due to the transverse electric field. In terms of energy state, the twist orientation is more similar to the bend orientation, rather than to the spray orientation. Therefore, it is possible to prevent the occurrence and the like of the spray orientation.

The liquid crystal display device of the present invention can be configured such that each of the intersections faces corresponding four of the pixel electrodes, and each of the four pixel electrodes has the at least one missing portion at a corner facing the intersection.

According to this configuration, each of the pixel electrodes has missing portions in four intersections that the pixel electrode faces. This makes it possible to more surely prevent the spread of the splay orientation region.

The liquid crystal display device of the present invention is the liquid crystal display device according to any one of claims 1 through 5, wherein the pixels are inversion-driven via the respective plurality of switching elements.

Note here that in a case of the inversion driving, adjacent ones of the pixel electrodes are likely to have respective different electric potentials. Therefore, the reverse transition into the spray orientation is likely to occur.

In this regard, according to the above configuration, the gap between adjacent ones of the pixel electrodes is wider at the intersections. Therefore, it is difficult that the spray orientation region thus generated spreads into the pixels.

The liquid crystal display device of the present invention can be configured such that the liquid crystal molecules have positive dielectric anisotropy.

Note here that in the case where the liquid crystal molecules have positive dielectric anisotropy, the spray orientation is likely to occur due to the reverse transition. The reverse transition occurs due to the transverse electric field generated for example in the gap between adjacent ones of the pixels or in a gap between the pixel electrodes and the bus lines (i.e., the plurality of gate bus lines or the plurality of source bus lines). In this regard, the above configuration makes it possible to prevent the occurrence and spread of the spray orientation.

The liquid crystal display device of the present invention can be configured such that the pixel electrodes overlap the plurality of gate bus lines as seen in plan view.

The liquid crystal display device of the present invention can be configured such that the pixel electrodes overlap the plurality of source bus lines as seen in plan view.

According to this configuration, the pixel electrodes overlap the bus lines (i.e., the plurality of gate bus lines or the plurality of source bus lines). Accordingly, a greater part of the liquid crystal layer is subjected to voltage application. This makes it possible to surely carry out transition from an initial orientation state (i.e., splay orientation state) into the bend orientation state.

As so far described, the liquid crystal display device of the present invention is configured such that the gap between adjacent ones of the pixel electrodes is wider at the intersections of the plurality of gate bus lines and the plurality of source bus lines than in areas other than the intersections.

Accordingly, it is possible to prevent a deterioration in display quality, which deterioration is caused by the occurrence and spread of the reverse transition.

BRIEF DESCRIPTION OF DRAWINGS

FIG. 1, showing one embodiment of the present invention, is a view schematically illustrating how a liquid crystal display device is configured.

Figure 2:
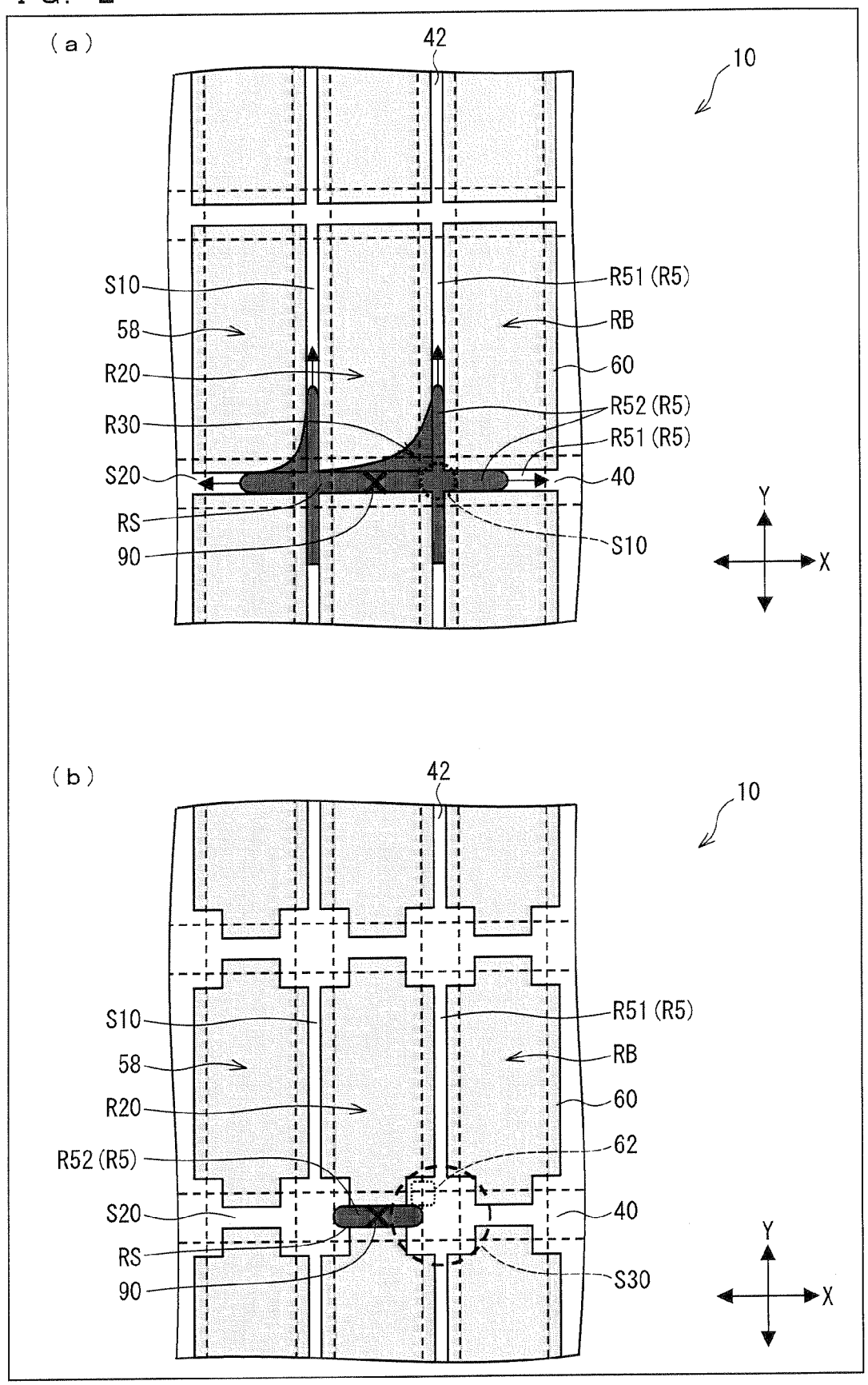
FIG. 2

(a) and (b) of FIG. 2 are views each schematically illustrating how a liquid crystal display device is configured. (a) of FIG. 2 illustrates how pixel electrodes of a conventional art are arranged. (b) of FIG. 2 illustrates how pixel electrodes of the present invention are arranged.

FIG. 3

Figure 3:
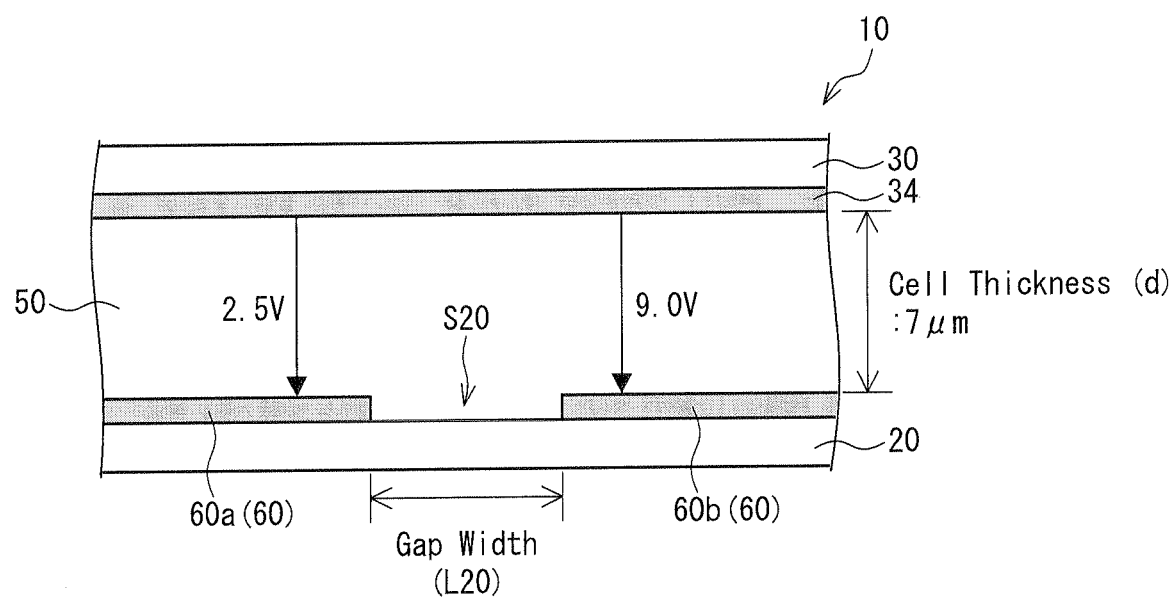

FIG. 3 is a cross-sectional view schematically illustrating how the liquid crystal display device is configured.

FIG. 4

Figure 4:
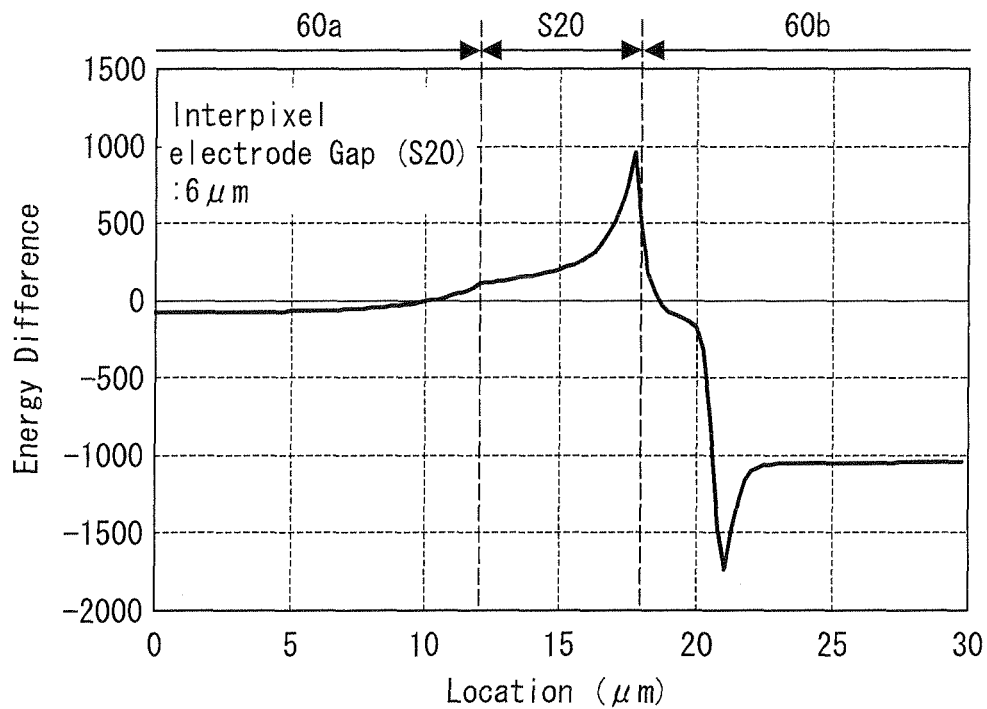

FIG. 4 is a graph illustrating Gibbs energy difference between adjacent pixel electrodes.

FIG. 5

Figure 5:
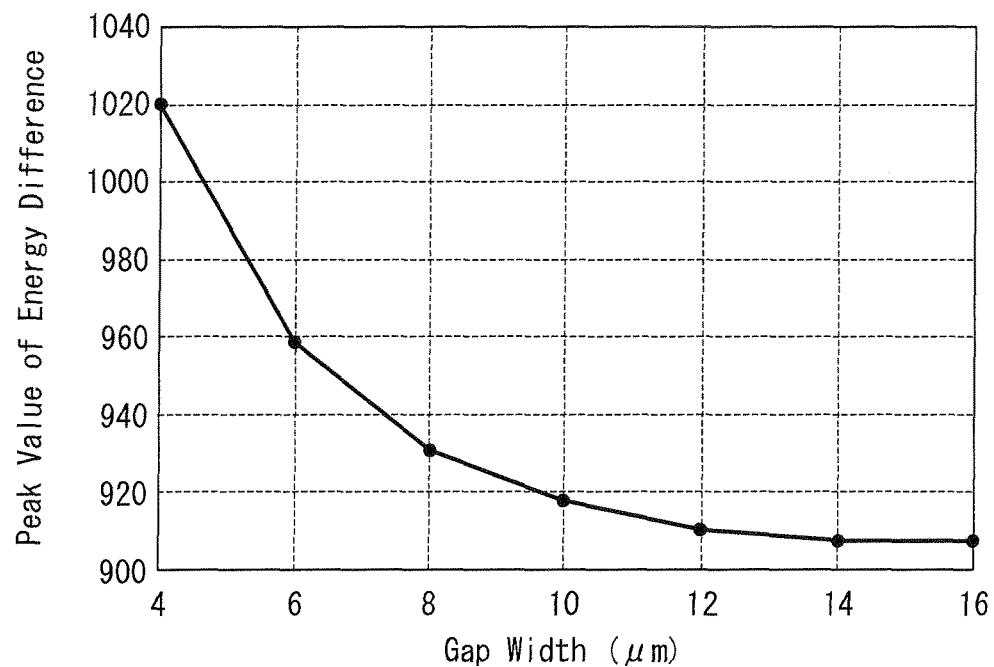

FIG. 5 is a graph illustrating a relation between a width of a gap and Gibbs energy difference.

FIG. 6

Figure 6:
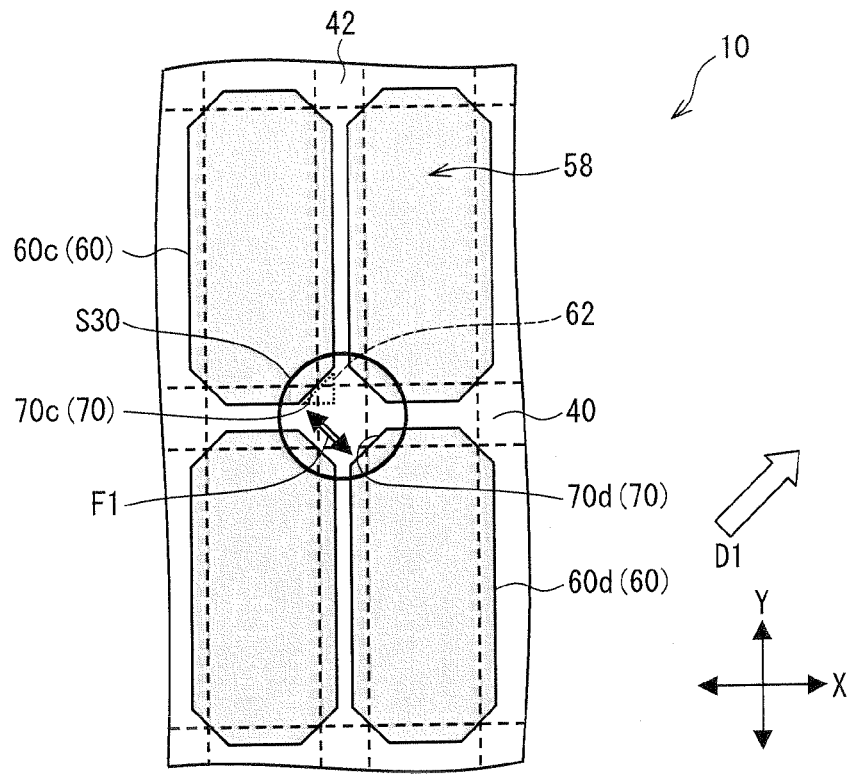

FIG. 6, showing another embodiment of the present invention, is a view schematically illustrating how a liquid crystal display device is configured.

FIG. 7

Figure 7:
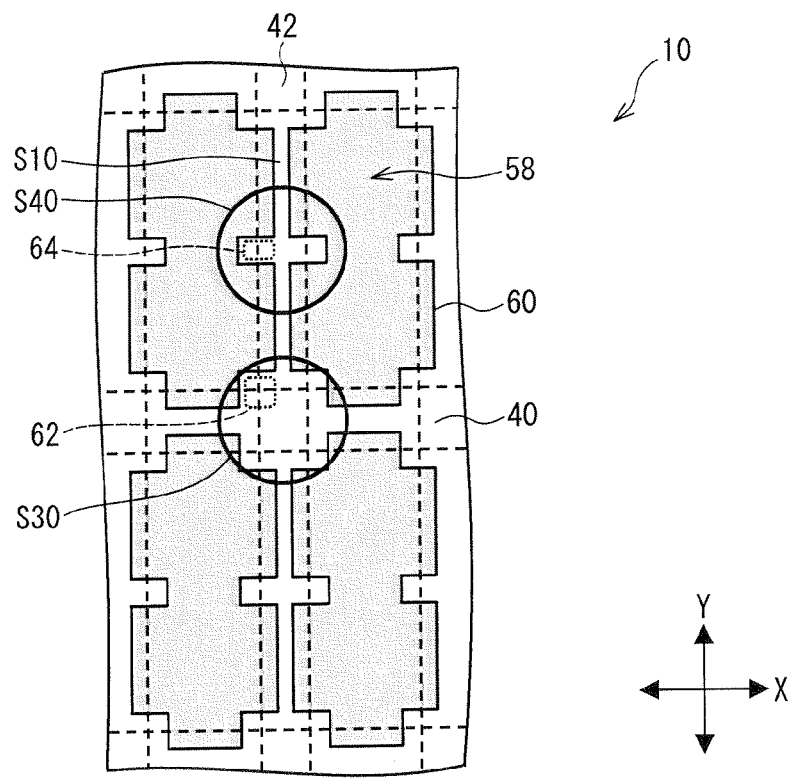

FIG. 7, showing still another embodiment of the present invention, is a view schematically illustrating how a liquid crystal display device is configured.

FIG. 8

Figure 8:
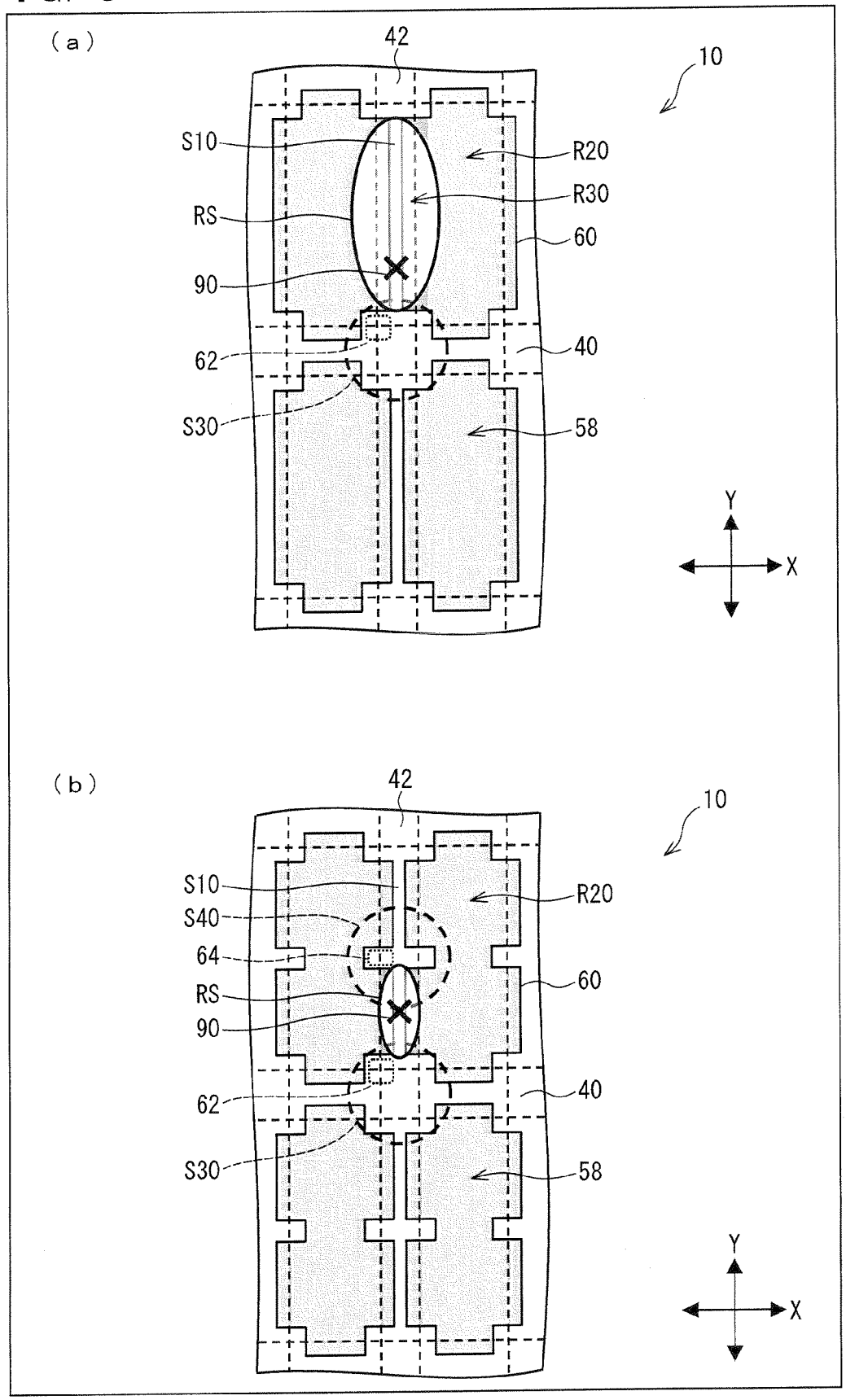

(a) and (b) of FIG. 8, showing the embodiments of the present invention, are views each schematically illustrating how the liquid crystal display device is configured.

FIG. 9

Figure 9:
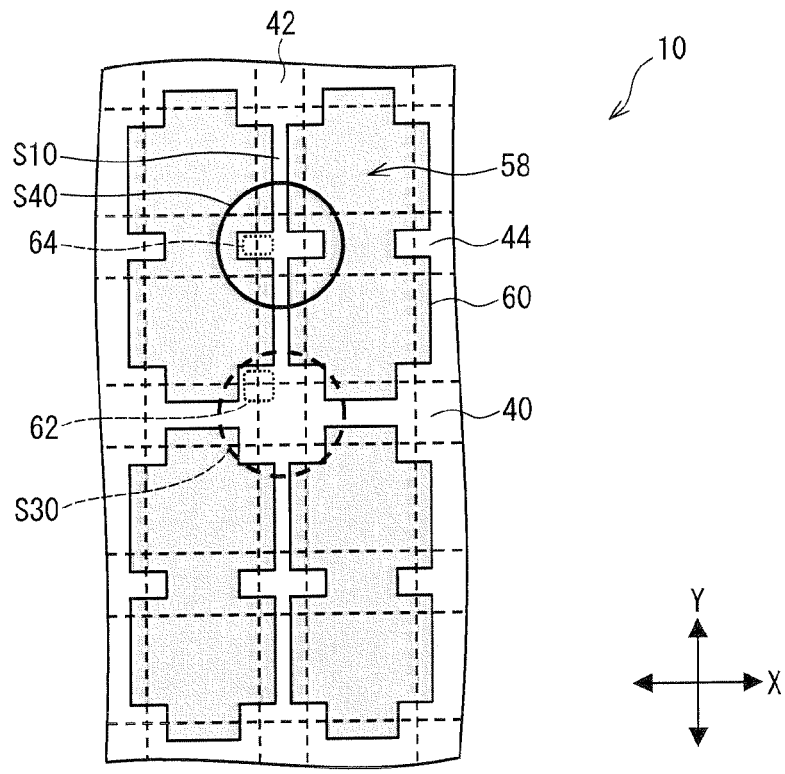

FIG. 9, showing yet another embodiment of the present invention, is a view schematically illustrating how a liquid crystal display device is configured.

FIG. 10

Figure 10:
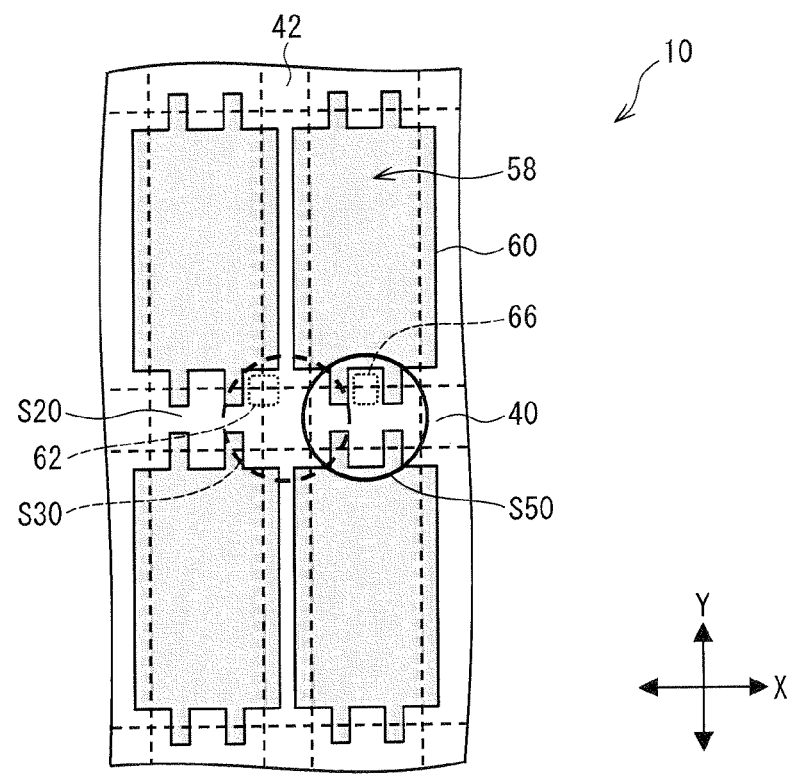

FIG. 10, showing still yet another embodiment of the present invention, is a view schematically illustrating how a liquid crystal display device is configured.

FIG. 11

Figure 11:
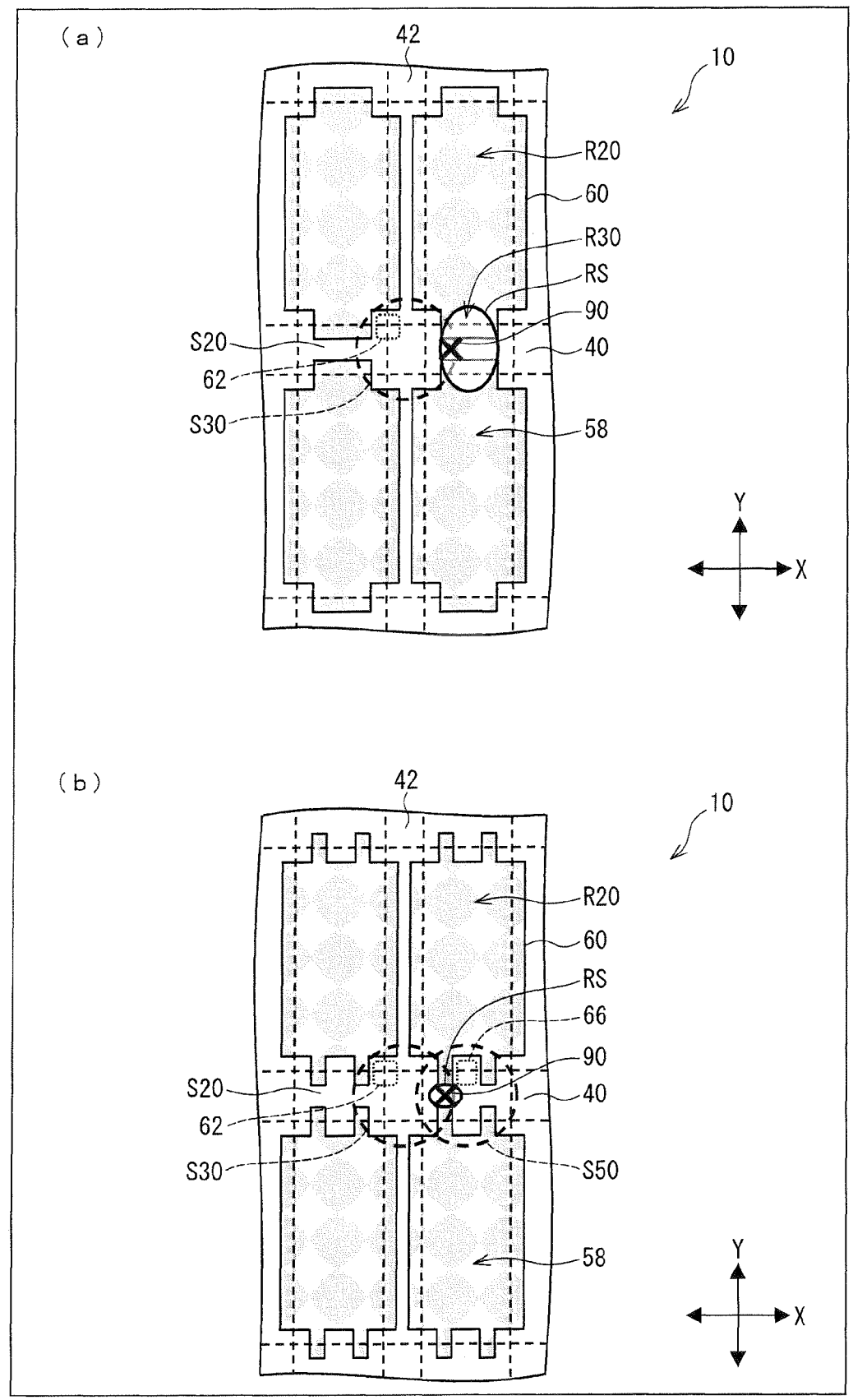

(a) and (b) of FIG. 11, showing the embodiments of the present invention, are views each schematically illustrating how the liquid crystal display device is configured.

FIG. 12

Figure 12:
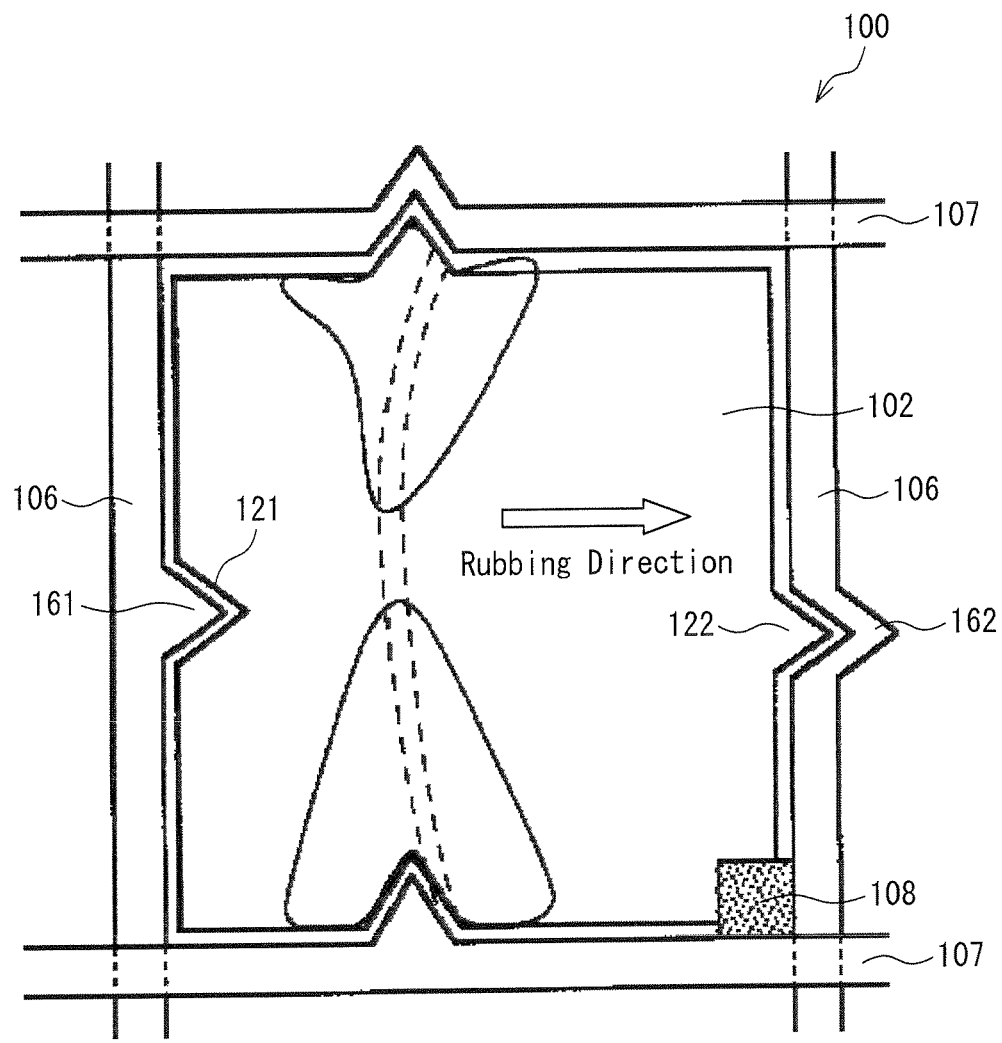

FIG. 12, showing a conventional art, is a view schematically illustrating how a liquid crystal display device is configured.

FIG. 13

Figure 13:
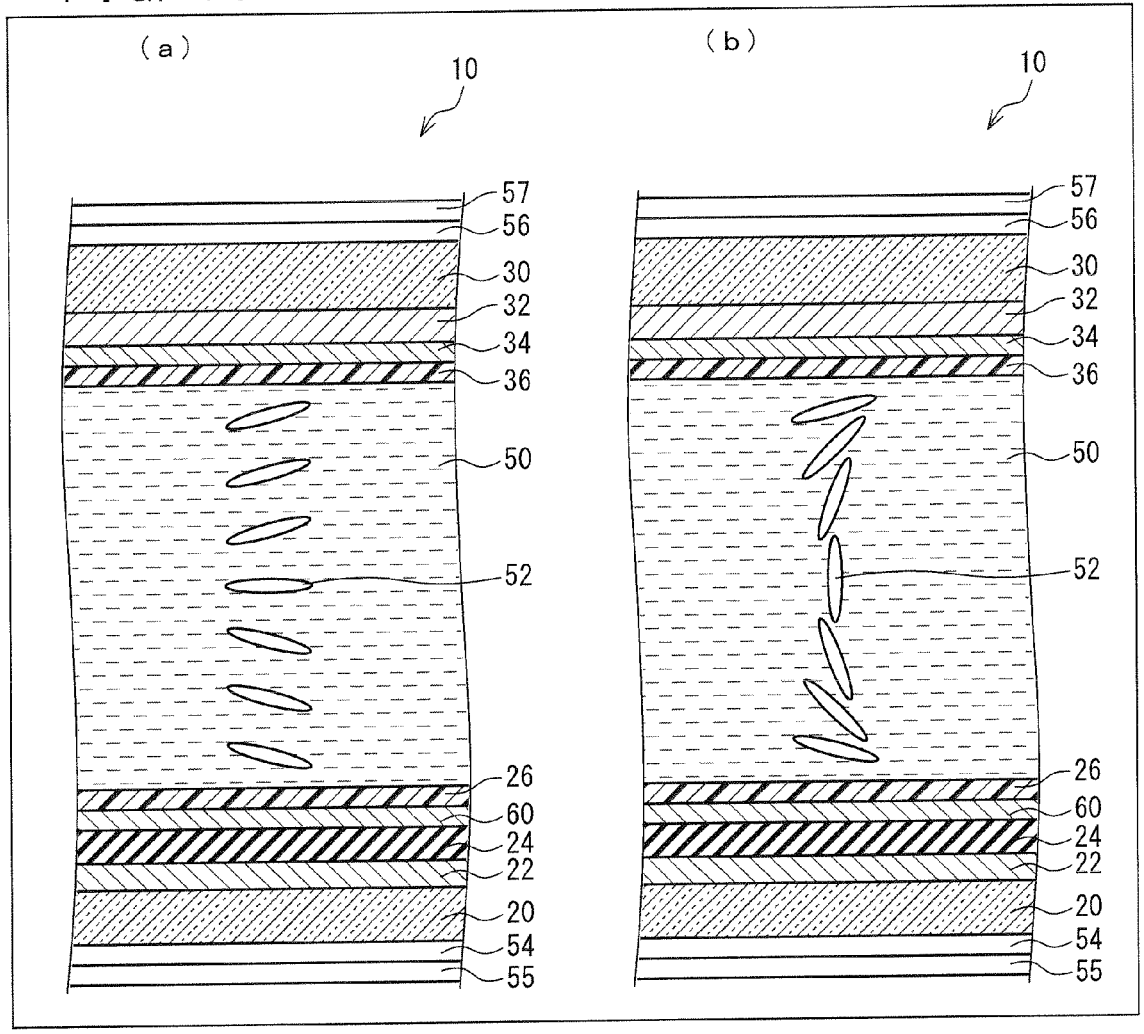

(a) and (b) of FIG. 13 are cross-sectional views each schematically illustrating how a liquid crystal display device is configured. (a) of FIG. 13 illustrates liquid crystal molecules in a splay orientation state, (b) of FIG. 13 illustrates liquid crystal molecules in a bend orientation state.

FIG. 14

Figure 14:
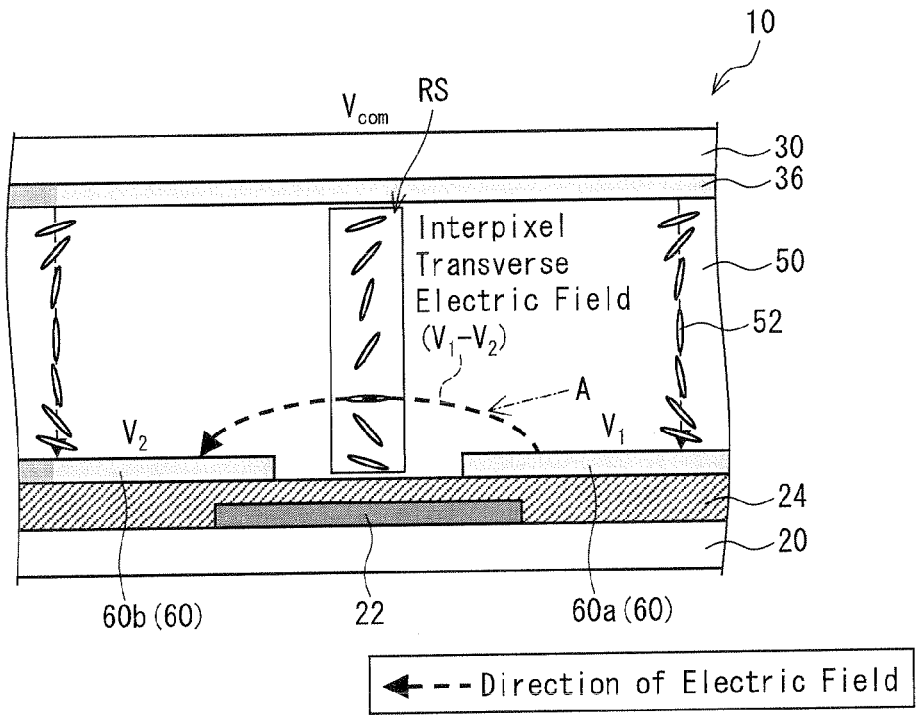

FIG. 14 is a cross-sectional view schematically illustrating how a liquid crystal display device is configured.

FIG. 15

Figure 15:
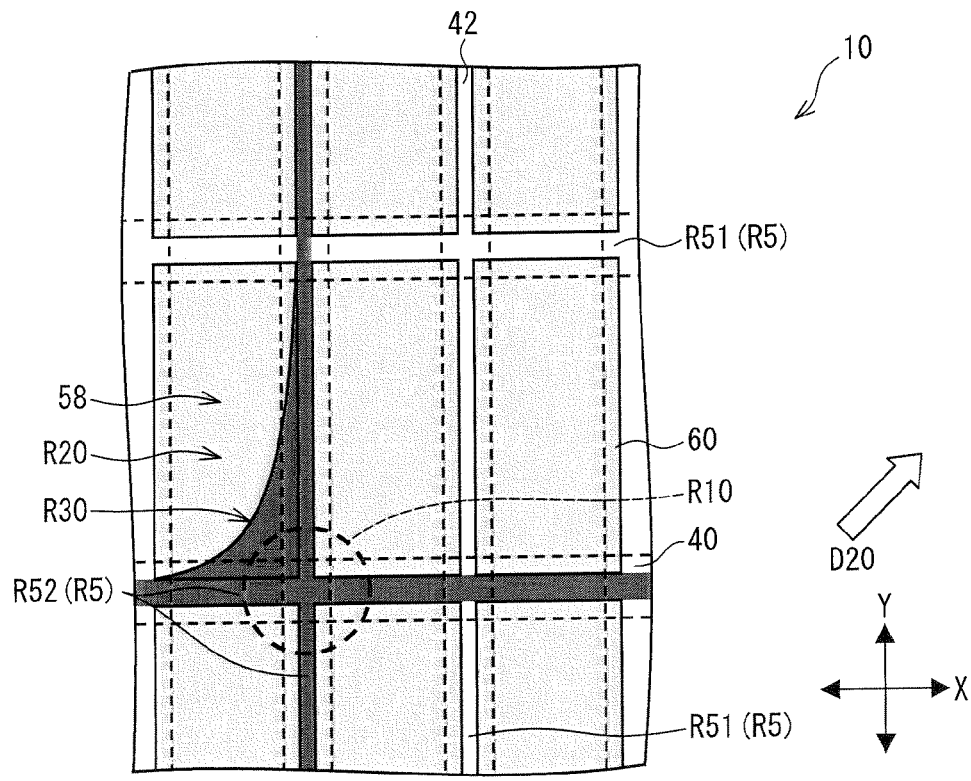

FIG. 15 is a view schematically illustrating how a liquid crystal display device is configured.

REFERENCE SIGNS LIST

10 Liquid Crystal Display Device
20 First Substrate
30 Second Substrate
34 Counter Electrode
40 Gate Bus Line
42 Source Bus Line
50 Liquid Crystal Layer
52 Liquid Crystal Molecule
58 Pixel
60 Pixel Electrode
62 Missing Portion
64 Missing Portion
66 Missing Portion
S10 Inter-pixel electrode Gap (Gap Between Pixel Electrodes)
S20 Inter-pixel electrode Gap (Gap Between Pixel Electrodes)
S30 Intersection

DESCRIPTION OF EMBODIMENTS

Embodiment 1

An embodiment of the present invention is described below with reference to drawings such as FIG. 1.

Figure 1:
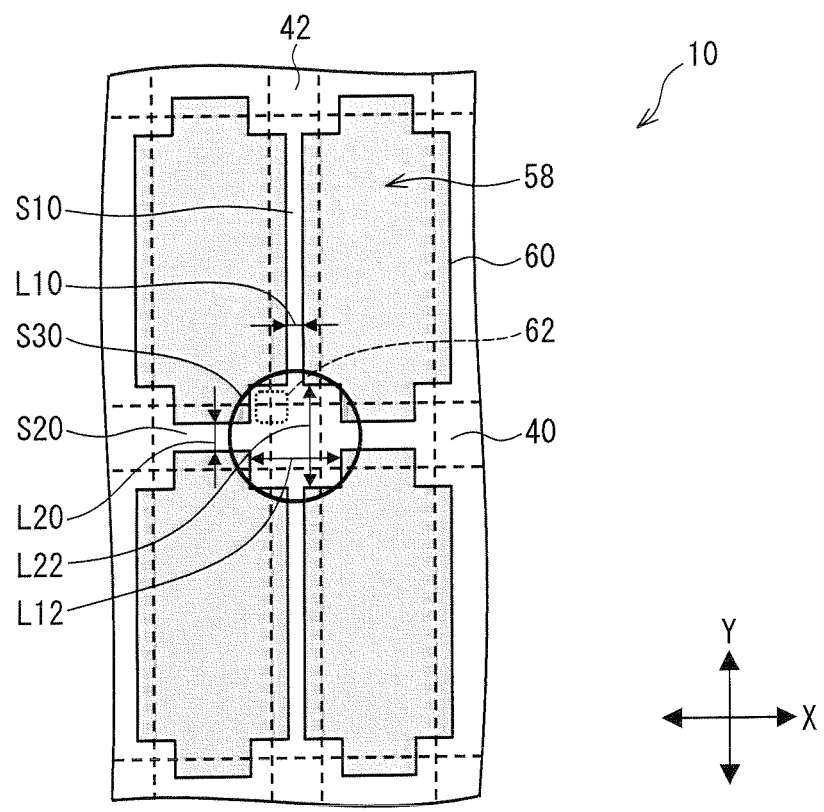
FIG. 1

FIG. 1 is a view illustrating a shape of a pixel electrode in a liquid crystal display device of the present embodiment.

A liquid crystal display device 10 of the present embodiment has a configuration substantially similar to that of the liquid crystal display 10 described earlier with reference to FIG. 15.

That is, the liquid crystal display device 10 of the present embodiment includes a plurality of gate bus lines 40 and a plurality of source bus lines 42. The plurality of gate bus lines 40 extend along a lateral direction of the liquid crystal display device 10, i.e., a direction indicated by a two-headed arrow X. On the other hand, the plurality of source bus lines 42 extend along a longitudinal direction of the liquid crystal display device 10, i.e., a direction indicated by a two-headed arrow Y.

Adjacent ones of the plurality of gate bus lines 40 and adjacent ones of the plurality of source bus lines 42 define regions each of which is in a substantially-rectangular shape. These regions serve as pixels 58. The pixels 58 correspond to respective pixel electrodes 60, each of which is in a substantially rectangular shape.

The liquid crystal display device 10 further includes switching elements (not illustrated), which are provided to respective intersections of the plurality of gate bus lines 40 and the plurality of source bus lines 42.

(Shape of Pixel Electrode)

A feature of the liquid crystal display device 10 of the present embodiment is such that the pixel electrodes 60 each have missing portions 62 (see FIG. 1).

That is, according to the conventional liquid crystal display device 10 described earlier with reference to FIG. 15, each of the pixel electrodes 60 is in a substantially rectangular shape, and does not have any large missing portion in the rectangular shape.

In contrast, according to the liquid crystal display device 10 of the present embodiment, each of the pixel electrodes 60 is in a rectangular shape with its four corners missing. Specifically, the four corners of the rectangular shape are missing in such a way that each of the missing portions (i.e., missing portions 62) is in the quadrangular shape. More specifically, each of the missing portions 62 is for example in a substantially square shape.

In other words, the pixel electrodes 60 have the missing portions 62 in intersections S30 of the plurality of gate bus lines 40 and the plurality of source bus lines 42.

Each of the quadrangular-shaped missing portions 62 has four sides, each of which is parallel with or perpendicular to sides of a pixel electrode 60 in which the missing portions 62 have not yet been made.

(Gap Between Pixel Electrodes)

The following description discusses a gap between adjacent ones of the pixel electrodes 60.

According to the conventional liquid crystal display device 10 described earlier with reference to FIG. 15, widths of (i) a gap between pixel electrodes 60 adjacent to each other along the direction indicated by the two-headed arrow X and (ii) a gap between pixel electrodes 60 adjacent to each other along the direction indicated by the two-headed arrow Y are identical and substantially constant throughout entire length of long sides and short sides of the rectangular-shaped pixel electrodes 60.

In contrast, according to the liquid crystal display device of the present embodiment, a gap between pixel electrodes 60 adjacent to each other along the lateral direction (i.e., the direction indicated by the two-headed arrow X) has different widths (referred to as gap widths) L12 and L10 at the intersections S30 and in areas other than the intersections S30, respectively.

That is, the gap width L12 between the adjacent pixel electrodes 60 at the intersections S30 is wider than the gap width L10 in areas other than the intersections S30. This is because the pixel electrodes 60 have the missing portions 62 in the intersections S30 and have no missing portion 62 in the areas other than the intersections S30.

Similarly, a gap between pixel electrodes 60 adjacent to each other along the longitudinal direction (i.e., the direction indicated by the two-headed arrow Y) has different gap widths L22 and L20 at the intersections S30 and in areas other than the intersections S30, respectively.

That is, the gap width L22 between the adjacent pixel electrodes 60 at the intersections S30 is wider than the gap width L20 in areas other than the intersections S30. This is because the pixel electrodes 60 have the missing portions 62 in the intersections S30 and have no missing portion 62 in the areas other than the intersections S30.

(Overlap of Pixel Electrodes and Bus Lines)

Further, according to the liquid crystal display device of the present embodiment, the pixel electrodes 60 overlap, as seen in plan view, bus lines such as the plurality of gate bus lines 40 and the plurality of source bus lines 42.

Specifically, as to the areas other than the intersections S30 in which the missing portions 62 are provided, the following applies. That is, edges, of the pixel electrodes 60, which are parallel with the direction indicated by the two-headed arrow X, are provided above the plurality of source bus lines 42 as seen in plan view. On the other hand, edges, of the pixel electrodes 60, which are parallel with the direction indicated by the two-headed arrow Y, are provided above the plurality of gate bus lines 40 as seen in plan view.

Accordingly, a gap S10 between pixel electrodes 60 adjacent to each other along the direction indicated by the two-headed arrow X (such a gap is hereinafter referred to as an inter-pixel electrode gap) is provided above corresponding one of the plurality of source bus lines 42. Similarly, an inter-pixel electrode gap S20 between pixel electrodes 60 adjacent to each other along the direction indicated by the two-headed arrow Y is provided above corresponding one of the plurality of gate bus lines 40.

(Effect of Overlap)

As described above, the pixel electrodes 60 overlap the bus lines (i.e., the plurality of gate bus lines 40 and the plurality of source bus lines 42). This reduces a portion, of a liquid crystal layer 50, to which no voltage is applied. Accordingly, it is possible to more surely carry out initial splay-bend transition (transition from the splay orientation into the bend orientation).

Further, it is possible to improve an aperture ratio while reducing coupling capacitances between the pixel electrodes 60 and the bus lines.

(Gap Between Pixel Electrodes)

The following description discusses an effect of the missing portions 62.

According to the liquid crystal display device 10 of the present embodiment, the inter-pixel electrode gaps S10 and S20 are wider at the intersections S30 of the bus lines. Accordingly, while the liquid crystal molecules 52 of the entire display screen are being in the bend orientation state, it is difficult that the spray orientation caused by the reverse transition spreads into the display region R20 (i.e., a pixel 58). This is described below with reference to the drawings.

(a) and (b) of FIG. 2 each schematically illustrate how a the liquid crystal display device 10 is configured. (a) of FIG. 2 illustrates how the pixel electrodes 60 of the conventional art are arranged. (b) of FIG. 2 illustrates how the pixel electrodes 60 of the present embodiment are arranged.

(Conventional Liquid Crystal Display Device)

According to the conventional liquid crystal display device 10, the following sometimes occurs. That is, in a case where spray orientation regions RS are generated in for example the inter-pixel electrode gaps S10 and S20 due to the reverse transition, the spray orientation regions RS thus generated sometimes spread into the display region R20 (see (a) of FIG. 2). This is described as follows.

First, one of factors that contribute to the reverse transition, due to which the spray orientation regions RS are generated in the inter-pixel electrode gaps S10 and S20, is a transverse electric field generated between adjacent ones of the pixel electrodes 60. That is, adjacent ones of the pixel electrodes 60 may have respective different electric potentials. Specifically, the electric potentials of the adjacent ones of the pixel electrodes 60 may be different from each other depending on what is to be displayed and how driving is carried out, e.g., depending on (i) a difference between electric potentials that are generated when a white display is carried out and when a black display is carried out, (ii) a difference between electric potentials having a positive polarity and having a negative polarity, or (iii) the like. Such a difference between the electric potentials contributes to the generation of the transverse electric field in the inter-pixel electrode gaps S10 and S20.

Further, for example in a case where a foreign material 90 (indicated by x in (a) of FIG. 2) exists in the inter-pixel electrode gaps S10 and/or S20 in which the transverse electric field is generated, the spray orientation becomes more likely to start occurring at the foreign material 90.

Once the splay orientation occurs, the splay orientation thus occurred spreads, due to the transverse electric field that is being generated in the inter-pixel electrode gaps S10 and S20, into other portions of the inter-pixel electrode gaps S10 and S20. Then, the splay (spray) orientation finally spreads over the inter-pixel electrode gaps S10 and S20 of the entire display screen.

On the other hand, even if the spray orientation occurs in the inter-pixel electrode gaps S10 and S20 as above, it is difficult that the spray orientation regions RS in the inter-pixel electrode gaps S10 and S20 spread into the display region R20 (i.e., the pixel 58), in a case where the pixel electrodes 60 are receiving voltages sufficiently high for keeping the liquid crystal molecules in the bend orientation state.

Note however that, during an actual display, the voltage applied to the pixel electrodes 60 may be reduced to a voltage Vcr (i.e., a boundary voltage between the spray and bend orientations) so that for example a white display is achieved with high brightness.

If the voltage applied to the pixel electrodes 60 is reduced to the voltage Vcr, the spray orientation regions RS in the inter-pixel electrode gaps S10 and S20 spread into the display region R20. Specifically, for example, (i) a spray orientation region RS in the inter-pixel electrode gap S20 above corresponding one of the plurality of gate bus lines 40 and (ii) a spray orientation region RS in the inter-pixel electrode gap S10 above corresponding one of the plurality of source bus lines 42 merge together due to surface tension, and spread into the display region R20.

(Liquid Crystal Display Device of Present Embodiment)

In contrast, according to the liquid crystal display device 10 of the present embodiment (illustrated in (b) of FIG. 2), it is possible to prevent the spray orientation from spreading into the display region R20. This is described below.

As illustrated in (b) of FIG. 2, for example even in a case where (i) the foreign material 90 (indicated by x in (b) of FIG. 2) exists in the inter-pixel electrode gap S20 defined by pixel electrodes 60 adjacent to each other along a direction indicated by a two-headed arrow Y and therefore (ii) the spray orientation occurs in the inter-pixel electrode gap S20, the spray orientation region RS stops spreading at the intersections S30, at which a gap between the pixel electrodes 60 is wider.

Specifically, as described earlier, the pixel electrodes have the missing portions 62. This makes the gap between the pixel electrodes 60 wider at the intersections S30. Therefore, the spray orientation region RS is reduced in its spreading force, and thus stops spreading at the missing portions 62.

One of factors that contribute to the reduction in the spreading force is as follows. In a case where the gap between the pixel electrodes 60 is made wider, the transverse electric field becomes relatively small. This makes the spray orientation region RS to be less likely to spread into other portions of the inter-pixel electrode gaps S10 and S20. Accordingly, the spray orientation region RS becomes less likely to spread into the intersections S30 (missing portions 62) of the bus lines 40 and 42.

As a result, even if the voltage applied to the pixel electrodes 60 is reduced to a voltage as low as the voltage Vcr, it is difficult that the spray orientation region RS spreads into the display region R2. In other words, it becomes easier to keep the bend orientation state even with low voltages.

As such, it is possible to lower a white voltage, which is applied to the pixel electrodes 60 when the white display is carried out. This makes it possible to achieve a display with a high response speed and high brightness.

According to the liquid crystal display device 10 of the present embodiment, the gap between adjacent ones of the pixel electrodes 60 is made wider. Note here that the gap between adjacent ones of the pixel electrodes 60 is made wider only at a part of the gap by making the missing portions 62 in the pixel electrodes 60.

Therefore, unlike a configuration in which the gap between adjacent ones of the pixel electrodes 60 is made wider over the entire length thereof, it is possible to keep the reduction in aperture ratio small. As such, it is possible to prevent the display from being dark.

In other words, according to the liquid crystal display device 10 of the present embodiment, the gap between adjacent ones of the pixel electrodes 60 is wider at the intersections of the plurality of gate bus lines 40 and the plurality of source bus lines 42, in order for the spray orientation region RS not to spread while keeping the reduction in the aperture ratio small.

Further, the liquid crystal display device 10 does not require additional configuration such as a special circuit etc. for preventing the spread of the spray orientation region RS. This makes it possible to prevent unnecessary cost increase.

Furthermore, making the gap between adjacent ones of the pixel electrodes 60 wider at the intersections S30 makes it possible to reduce the intensity of the transverse electric field, which occurs (i) between adjacent ones of the pixel electrodes 60 and (ii) in the intersections S30.

Accordingly, it is possible to prevent, at the intersections S30 where the spray orientation region is likely to spread into the pixel 58, the occurrence of the spray orientation region. This makes it possible to keep the occurrence of a display defect low.

(Energy Difference)

Next, stability of the spray and bend orientations is described in view of an energy difference.

FIG. 3 is a cross-sectional view schematically illustrating how the liquid crystal display device 10 of the present embodiment is configured. FIG. 3 mainly illustrates a gap between pixel electrodes 60 (60*a* and 60*b*) adjacent to each other along the longitudinal direction (i.e., the direction indicated by the two-headed arrow Y).

As illustrated in FIG. 3, a cell thickness (d) of the liquid crystal display device 10 is 7 μm. The two pixel electrodes 60*a* and 60*b* are adjacent to each other.

The two pixel electrodes 60*a* and 60*b* adjacent to each other define a region, which is the inter-pixel electrode gap S20. In the inter-pixel electrode gap S20, a distance between an end surface of the pixel electrode 60*a* and an end surface of the pixel electrode 60*b* is a gap width L20.

Here, assume that the liquid crystal display device 10 is driven in such a way that an electric potential difference (voltage) between the pixel electrode 60*a* and the counter electrode 34 is 2.5 V, whereas an electric potential difference (voltage) between the pixel electrode 60*b* (which is adjacent to the pixel electrode 60*a*) and the counter electrode 34 is 9.0 V.

FIG. 4 is a graph illustrating Gibbs energy difference observed for the pixel electrodes 60*a* and 60*b* and the inter-pixel electrode gap S20, which are illustrated in FIG. 3.

In the graph of FIG. 4, a horizontal axis indicates a location (μm) in the liquid crystal display device, whereas a vertical axis indicates the energy difference. Specifically, in the horizontal axis, locations ranging from 0 μm to 12 μm correspond to the pixel electrode 60*a*, locations ranging from 12 μm to 18 μm correspond to the inter-pixel electrode gap S20, and locations ranging from 18 μm to 30 μm correspond to the pixel electrode 60*b*. That is, FIG. 4 illustrates a value of the energy difference as observed in a case where the gap width L20 of the inter-pixel electrode S20 is 6 μm.

Note here that the energy difference refers to a difference between energy of the bend orientation and energy of the spray orientation, and is represented by the following equation:

(Energy Difference)=(Energy of Bend Orientation)−(Energy of Spray Orientation)

Note here that in a case where the energy difference is positive, the spray orientation is stable and the bend orientation is unstable. In view of the necessity for stabilizing the bend orientation for the prevention of the reverse transition into the spray orientation, it is preferable that the energy difference be negative between any combination of pixel electrodes adjacent to each other. However, it is difficult to make the energy difference negative, because pixel electrodes adjacent to each other have respective different electric potentials and thus cause a transverse electric field to be generated between the adjacent pixel electrodes. Under the circumstances, it is desired to make the energy difference as small as possible.

For example, according to a configuration of FIG. 4 in which the gap width L20 is 6 μm, the energy difference is not negative but positive in the entire inter-pixel electrode gap S20. Further, the energy difference is increased to nearly 1000 in the vicinity of the end surface of the pixel electrode 60*b*.

In view of the circumstances, the inventors have sought for a suitable relation between the gap width L20 and the energy difference in order to make the energy difference as small as possible. The results thereof are described in FIG. 5.

FIG. 5 is a graph illustrating a relation between the gap width (μm) and a peak value of the energy difference in the inter-pixel electrode gap. That is, in the graph of FIG. 5, a horizontal axis indicates the width gap (μm), whereas a vertical axis indicates the peak value of the energy difference.

FIG. 5 shows that the larger the gap width between pixel electrodes adjacent to each other, the smaller the peak value of the energy difference. That is, the result demonstrates that making the gap width wider stabilizes the bend orientation in the inter-pixel electrode. gap.

(Wide Gap Width Resulting from Missing Portions)

In this respect, as described earlier, the liquid crystal display device 10 of the present embodiment has, in its pixel electrodes 60, the missing portions 62. Accordingly, a gap width between adjacent ones of the pixel electrodes 60 is wider in some areas.

In addition, the gap width is made wider in the intersections S30 of the bus lines. This makes it possible to prevent also a plurality of spray orientation regions RS from overlapping one another in the intersections S30, thereby further preventing the spread of the spray orientation regions RS.

Embodiment 2

Another embodiment of the present invention is described below with reference to FIG. 6. FIG. 6 schematically illustrates how a liquid crystal display device 10 of the present embodiment is configured.

Note that configurations other than the configurations described in the present embodiment are same as those described in Embodiment 1. For convenience of description, members having functions like as those illustrated in the drawings of Embodiment 1 are assigned like referential numerals, and their descriptions are omitted here.

The liquid crystal display device 10 of the present embodiment is different from the liquid crystal display device 10 of Embodiment 1 in terms of a shape of each of the missing portions 62 in the pixel electrodes 60.

That is, each of the missing portions 62 in the liquid crystal display device 10 of Embodiment 1 is in a quadrangular shape (see FIG. 1).

In contrast, each of the missing portions 62 in the liquid crystal display device 10 of the present embodiment is in a triangular shape (see FIG. 6).

Accordingly, although the gap width made wider by the missing portions 62 is smaller in its area size than that of a case of the missing portions 62 each having the quadrangular shape, it becomes possible to reduce an area size of missing portions of the pixel electrodes 60. As such, it is possible to prevent the reduction in the aperture ratio, thereby achieving a display with higher brightness.

(Angle)

Further, since each of the missing portions 62 in the liquid crystal display device 10 of the present invention is in the triangular shape, an end surface 70 of each of the pixel electrodes 60 which end surface faces a corresponding one of the intersections S30 is parallel neither with the lateral direction (the direction indicated by the two-headed arrow X) nor with the longitudinal direction (the direction indicated by the two-headed arrow Y), but is diagonal to the lateral and longitudinal directions. Specifically, for example, the end surface 70 is at an angle of 45 degrees with respect to the lateral and longitudinal directions.

Under such circumstances, for example assume that four pixel electrodes 60 such as pixel electrodes 60c and 60d are adjacent to one another across the intersection S30. The pixel electrodes 60c and 60d are diagonally opposite to each other, and have the end surfaces 70c and 70d that are substantially parallel with each other, respectively.

In a case where the pixel electrode 60c and the pixel electrode 60d have respective different electric potentials, a transverse electric field is generated between the pixel electrode 60c and the pixel electrode 60d. Note here that the end surface 70c of the pixel electrode 60c is substantially parallel with the end surface 70d of the pixel electrode 60d. Therefore, the transverse electric field generated is substantially perpendicular to the end surfaces 70c and 70d (the direction of the transverse electric field is indicated by a two-headed arrow F1).

(Rubbing Direction)

The following description discusses a direction in which rubbing is carried out (hereinafter referred to as a rubbing direction) during an alignment treatment for the liquid crystal display device 10 of the present embodiment.

The liquid crystal display device 10 has been subjected to the rubbing alignment treatment, which is along a direction at an angle of 45 degrees with respect to the lateral direction (i.e., the direction indicated by the two-headed arrow X). That is, the rubbing direction is at the angle of 45 degrees with respect to arrays of the pixels 58.

In other words, the rubbing alignment treatment has been carried out in such a way that the rubbing direction is in parallel with the end surface 70c of the pixel electrode 60c and with the end surface 70d of the pixel electrode 60d.

Accordingly, the rubbing direction (indicated by an arrow D1) is substantially orthogonal to the direction (indicated by the two-headed arrow F1) of the earlier-described transverse electric field which is generated between the end surface 70c of the pixel electrode 60c and the end surface 70d of the pixel electrode 60d.

As such, the reverse transition from the bend orientation into the spray orientation becomes less likely to occur. Specifically, the spray orientation hardly occurs even in a case where the transverse electric field is generated. Therefore, the spray orientation becomes less likely to spread.

The reason thereof is as follows. In a case where the rubbing direction (rubbing angle) is substantially perpendicular to the transverse electric field, twist orientation is more likely to occur than the spray orientation does. In terms of energy state, the twist orientation is more similar to the bend orientation, rather than to the spray orientation. Therefore, the spray orientation becomes less likely to occur, and thus the reverse transition becomes less likely to occur.

Embodiment 3

Still another embodiment of the present invention is described below with reference to FIG. 7. FIG. 7 schematically illustrates how a liquid crystal display device 10 of the present embodiment is configured.

Note that configurations other than the configurations described in the present embodiment are same as those described in Embodiments 1 and 2. For convenience of description, members having functions like as those of the members illustrated in the drawings of Embodiments 1 and 2 are assigned like referential numerals, and their descriptions are omitted here.

The liquid crystal display device 10 of the present embodiment has, in its pixel electrodes 60, additional missing portions. Therefore, the liquid crystal display device 10 of the present embodiment has more missing portions than the liquid crystal display device 10 of Embodiment 1 does.

That is, the liquid crystal display device 10 of Embodiment 1 has, in each of the pixel electrodes 60, four missing portions 62 in four corners of the pixel electrode 60 (see FIG. 1).

In contrast, the liquid crystal display device 10 of the present embodiment has, in each of the pixel electrodes 60, not only the missing portions 62 provided in the intersections S30 but also missing portions 64. Each of the missing portions 64 is provided in a central part or an area therearound (i.e., a long side center S40) of the pixel electrode 60 along a longitudinal direction (i.e., the direction indicated by the two-headed arrow Y) of the pixel electrode 60 having the substantially rectangular shape (see FIG. 7).

In other words, each of the missing portions 64 of the pixel electrode 60 is provided in (i) in a central part or an area therearound of corresponding one of the pixels 58 along a direction in which the plurality of source bus lines 42 extend, and (ii) above corresponding one of the plurality of source bus lines 42.

Further, according to the liquid crystal display device 10 of the present embodiment, the missing portions 64, each of which is in a corresponding long side center S40, are provided on respective long sides of the pixel electrodes 60. In other words, each of the pixel electrodes 60 has, in each of its long sides opposite to each other, corresponding one of the missing portions 64.

That is, the liquid crystal display device 10 of the present embodiment has, in each of the pixel electrodes 60, six missing portions in total (the missing portions 62 and the missing portions 64).

(Effect)

According to the liquid crystal display device 10 of the present embodiment, the inter-pixel electrode gaps are wider in many parts. This makes it possible to more surely prevent the spread of the spray orientation. This is described below with reference to the drawings.

(a) and (b) of FIG. 8 each schematically illustrate how a liquid crystal display device 10 is configured. (a) of FIG. 8 illustrates how the pixel electrodes 60 of Embodiment 1 are arranged. (b) of FIG. 8 illustrates how the pixel electrodes of present embodiment are arranged.

(Liquid Crystal Display Device of Embodiment 1)

In a case where (i) a transverse electric field is generated in the inter-pixel electrode gap S10 which is along the direction indicated by the two-headed arrow Y, and, particularly in a case where (ii) for example, a foreign material 90 exists above a source bus line 42 corresponding to the inter-pixel electrode gap S10 (as illustrated in (a) and (b) of FIG. 8), the spray orientation region RS is likely to be generated in the inter-pixel electrode gap S10 due to the reverse transition.

The spray orientation region RS further spreads due to the transverse electric field, and generally stops spreading, as illustrated in (a) of FIG. 8, at the intersections S30 of the plurality of gate bus lines 40 and the plurality of source bus lines 42.

Note however that, for example in a case where a voltage applied to the liquid crystal layer 50 is as low as the voltage Vcr, the spray orientation region RS may spread in a large oval shape (see (a) of FIG. 8).

Then, such a spray orientation region RS in the large oval shape may spread largely into the display region R20 (i.e., the pixel 58). A region into which the spray orientation region RS has spread is a spread region R30 shown in (a) of FIG. 8.

In this regard, the liquid crystal display device 10 of the present embodiment (illustrated in (b) of FIG. 8) makes it possible to prevent the spray orientation region RS from spreading into the display region R20.

Specifically, according to the liquid crystal display device 10 of the present embodiment, the gap width between adjacent ones of the pixel electrodes 60 is made wider not only at the intersections S30, but also in some areas of the inter-pixel gap S10 between pixel electrodes 60 adjacent to each other along the direction indicated by the two-headed arrow X (note here that the areas are the missing portions 64 each of which is in a corresponding long side center S40). This makes it possible to keep the spread of the spray orientation region RS (area size of the oval shape) small, and thus makes it possible to reduce an amount of the spread of the spray orientation region RS into the display region R20.

Embodiment 4

Yet another embodiment of the present invention is described below with reference to FIG. 9. FIG. 9 schematically illustrates how a liquid crystal display device 10 of the present embodiment is configured.

Note that configurations other than the configurations described in the present embodiment are same as those described in Embodiments 1 through 3. For convenience of description, members having functions like as those illustrated in the drawings of Embodiments 1 through 3 are assigned like referential numerals, and their descriptions are omitted here.

The liquid crystal display device 10 of the present embodiment is different from the liquid crystal display device 10 of Embodiment 3 in that the liquid crystal display device 10 of the present embodiment has storage capacitor bus lines 44.

That is, the liquid crystal display device 10 of the present embodiment has the storage capacitor bus lines 44 that are parallel with (i.e., along the lateral direction which is indicated by the two-headed arrow X) the plurality of gate bus lines 40 (see FIG. 9).

Each of the storage capacitor bus lines 44 is provided in such a way as to intersect corresponding ones of the pixel electrodes 60 and to pass through the long side center S40 of each of the pixel electrodes 60. Note here that the long side center S40 intends to the central part and an area therearound, in the longitudinal direction (the direction indicated by the two-headed arrow Y), of each of the pixel electrodes 60 having the substantially rectangular shape.

In other words, each of the storage capacitor bus lines 44 is provided in such a way as to overlap, as seen in plan view, corresponding ones of the missing portions 64 each of which is provided in a corresponding long side center S40.

The liquid crystal display device 10 of the present embodiment thus arranged makes it possible to keep the reduction in the aperture ratio small, which reduction results from the provision of the storage capacitor bus lines 44.

That is, generally, the storage capacitor bus lines 44 are made of light-shielding metal. Therefore, regions in which the storage capacitor bus lines 44 are provided as seen in plan view do not contribute to a display and therefore reduces the aperture ratio.

In this regard, according to the liquid crystal display device 10 of the present embodiment, the storage capacitor bus lines 44 overlap the missing portions 64 as seen in plan view. That is, part of the regions, in which the storage capacitor bus lines 44 are provided and which therefore reduce the aperture ratio, is a region which in the first place does not contribute to a display due to the missing portions 64 in the pixel electrodes 60.

Accordingly, it is possible to keep the reduction in the aperture ratio which reduction results from the provision of the storage capacitor bus lines 44 small. As such, it is possible to achieve a display with high brightness.

Embodiment 5

Still yet another embodiment of the present invention is described below with reference to FIG. 10. FIG. 10 schematically illustrates how a liquid crystal display device 10 of the present embodiment is configured.

Note that configurations other than the configurations described in the present embodiment are same as those described in Embodiments 1 through 4. For convenience of description, members having functions like as those illustrated in the drawings of Embodiments 1 through 4 are assigned like referential numerals, and their descriptions are omitted here.

The liquid crystal display device 10 of the present embodiment is different from the liquid crystal display device 10 of Embodiment 4 in the following point. That although both the liquid crystal display device 10 of the present embodiment and the liquid crystal display device 10 of Embodiment 4 are configured such that additional missing portions are provided to the liquid crystal display device 10 of Embodiment 1, locations of the additional missing portions are different between the liquid crystal display device 10 of the present embodiment and the liquid crystal display device 10 of Embodiment 4.

That is, the liquid crystal display device 10 of Embodiment 4 was configured such that the missing portions 64 were provided on sides, of the pixel electrodes 60 of the liquid crystal display device 10 of Embodiment 1, which were parallel with the plurality of source bus lines 42. In other words, the missing portions 64 of the liquid crystal display device 10 of Embodiment 4 were provided on the sides of the pixel electrodes 60 along the direction indicated by the two-headed arrow Y.

In contrast, according to the liquid crystal display device 10 of the present embodiment, the missing portions are provided above the plurality of gate bus lines 40. Specifically, each of the pixel electrodes 60 has corresponding missing portions 66 provided on its sides which are parallel with the plurality of gate bus lines 40. In other words, each of the pixel electrodes 60 has the missing portions 66 provided on its lateral sides (i.e., the sides along a direction indicated by the two-headed arrow X).

That is, as illustrated in FIG. 10, the liquid crystal display device 10 of the present embodiment has, in each of the pixel electrodes 60, not only the missing portions provided in the intersections S30 but also the missing portions 66. Each of the missing portions 66 is provided in a central part or an area therearound (i.e., a short side center S50), of the pixel electrode 60, along a lateral direction (i.e., the direction indicated by the two-headed arrow X) of the pixel electrode 60 having the substantially-rectangular shape.

In other words, each of the missing portions 66 of the pixel electrodes 60 is provided (i) in a central part or an area therearound, of corresponding one of the pixels 58, along a direction in which the plurality of gate bus lines 40 extend, and (ii) above corresponding one of the plurality of gate bus lines 40.

Further, according to the liquid crystal display device 10 of the present embodiment, the missing portions 66, each of which is provided in a corresponding short side center S50, are provided on respective short sides of the pixel electrodes 60. In other words, each of the pixel electrodes 60 has, in each of its short sides opposite to each other, corresponding one of the missing portions 66.

That is, the liquid crystal display device 10 of the present embodiment has, in each of the pixel electrodes 60, six missing portions in total (the missing portions 62 and the missing portions 66).

(Effect)

According to the liquid crystal display device 10 of the present embodiment, the inter-pixel electrode gaps are wider in many parts. This makes it possible to more surely prevent the spread of the spray orientation. This effect is substantially same as that of the liquid crystal display device 10 of Embodiment 3 described earlier. This effect is described below with reference to the drawings.

(a) and (b) of FIG. 11 each schematically illustrate how a liquid crystal display device 10 is configured. (a) of FIG. 11 illustrates how the pixel electrodes 60 of Embodiment 1 are arranged. (b) of FIG. 11 illustrates how the pixel electrodes of the present embodiment are arranged.

(Liquid Crystal Display Device of Embodiment 1)

In a case where (i) a transverse electric field is generated in the inter-pixel electrode gap S10 which is along the direction indicated by the two-headed arrow X, and, particularly in a case where (ii) for example, a foreign material 90 exists above a gate bus line 40 which corresponds to the inter-pixel electrode gap S10 (as illustrated in (a) and (b) of FIG. 11), the spray orientation region RS is likely to be generated in the inter-pixel electrode gap S10 due to the reverse transition.

The spray orientation region RS further spreads due to the transverse electric field, and generally stops spreading, as illustrated in (a) of FIG. 11, at the intersections S30 of the plurality of gate bus lines and the plurality of source bus lines 42.

Note however that, as is the case with the example described earlier with reference to (a) of FIG. 8, in a case where a voltage applied to the liquid crystal layer 50 is as low as the voltage Vcr, the spray orientation region RS may spread in a large oval (see (a) of FIG. 11).

Then, such a spray orientation region RS in the large oval shape may spread largely into the display region R20 (i.e., the pixel 58). A region into which the spray orientation region RS has spread into is a spread region R30 shown in (a) of FIG. 11.

In this regard, the liquid crystal display device 10 of the present embodiment (illustrated in (b) of FIG. 11) makes it possible to prevent the spray orientation region RS from spreading into the display region R20.

Specifically, according to the liquid crystal display device 10 of the present embodiment, the gap width between adjacent ones of the pixel electrodes 60 is made wider not only at the intersections S30, but also in some areas of the inter-pixel gap S10 between pixel electrodes 60 adjacent to each other along the direction indicated by the two-headed arrow Y (note here that the areas are the missing portions 66 each of which is in a corresponding short side center S50). This makes it possible to keep the spread of the spray orientation region RS (area size of the oval shape) small, and thus makes it possible to reduce an amount of the spread of the spray orientation region RS into the display region R20.

The above descriptions dealt with a configuration in which the pixel electrodes 60 overlap, as seen in plan view, the bus lines (i.e., the plurality of gate bus lines 40 and the plurality of source bus lines 42). According to this configuration, the pixel electrodes 60 are provided on a layer different from that on which the bus lines are provided. In this configuration, the transverse electric field is generated mainly between adjacent ones of the pixel electrodes 60 (see FIG. 14).

The configuration of the liquid crystal display device of the present invention is not limited to the above configuration, and therefore can be for example a configuration in which the pixel electrodes 60 do not overlap the bus lines as seen in plan view.

According to this configuration, the pixel electrodes 60 can be provided on the layer different from that on which the bus lines are provided, in the same way as described above. Alternatively, the pixel electrodes 60 can be provided on a layer same as that on which the bus lines are provided.

In the case where the pixel electrodes 60 are provided on the layer different from that on which the bus lines are provided, the transverse electric field is generated, in the same way as described above, mainly between adjacent ones of the pixel electrodes 60.

On the other hand, in the case where the pixel electrodes 60 are provide on the layer same as that on which the bus lines are provided, the transverse electric field is generated mainly between a pixel electrode 60 and a bus line which are adjacent to each other. This configuration also makes it possible to prevent the generation and spread of the spray orientation region, because a distance between the pixel electrode 60 and the bus line becomes wider as the gap width between adjacent ones of the pixel electrodes 60 is made wider.

The invention is not limited to the description of the embodiments above, but may be altered within the scope of the claims. An embodiment based on a proper combination of technical means disclosed in different embodiments is encompassed in the technical scope of the invention.

INDUSTRIAL APPLICABILITY

The present invention makes it possible to prevent deterioration in display quality, which deterioration is caused by reverse transition. Accordingly, the present invention is suitably applicable to a liquid crystal display device which is desired to carry out a high-quality display, particularly to a liquid crystal display device for use in a mobile device.

The invention claimed is:

1. An OCB mode liquid crystal display device, comprising:
a first substrate;
a second substrate;
a liquid crystal layer sandwiched and sealed between the first substrate and the second substrate; and
pixels arrayed in matrix, the first substrate being provided with: a plurality of gate bus lines, a plurality of source bus lines which intersect the plurality of gate bus lines, a plurality of switching elements each of which is electrically connected with corresponding one of the plurality of gate bus lines and with corresponding one of the plurality of source bus lines, and pixel electrodes which correspond to the respective pixels and are electrically connected with the respective switching elements, the second substrate being provided with a counter electrode, the liquid crystal layer containing liquid crystal molecules, which are in a splay orientation state while no voltage is applied to the liquid crystal layer and are caused to be in a bend orientation state when a voltage is applied to the liquid crystal layer, adjacent ones of the pixel electrodes having a gap therebetween, the gap being wider at intersections of the plurality of gate bus lines and the plurality of source bus lines than in areas other than the intersections;

wherein the pixels are rectangular-shaped regions defined by the plurality of gate bus lines and the plurality of source bus lines; each of the pixel electrodes corresponding to the respective pixels has at least one missing portion which corresponds to a corner of the rectangular-shaped region; and said at least one missing portion makes the gap between adjacent ones of the pixel electrodes wider at the intersections;

wherein each of the intersections faces corresponding four of the pixel electrodes, and each of the four pixel electrodes has said at least one missing portion at a corner facing the intersection; and wherein said at least one missing portion is in a quadrangular shape.

2. An OCB mode liquid crystal display device, comprising:
a first substrate;
a second substrate;
a liquid crystal layer sandwiched and sealed between the first substrate and the second substrate; and
pixels arrayed in matrix, the first substrate being provided with: a plurality of gate bus lines, a plurality of source bus lines which intersect the plurality of gate bus lines, a plurality of switching elements each of which is electrically connected with corresponding one of the plurality of gate bus lines and with corresponding one of the plurality of source bus lines, and pixel electrodes which correspond to the respective pixels and are electrically connected with the respective switching elements, the second substrate being provided with a counter electrode, the liquid crystal layer containing liquid crystal molecules, which are in a splay orientation state while no voltage is applied to the liquid crystal layer and are caused to be in a bend orientation state when a voltage is applied to the liquid crystal layer, adjacent ones of the pixel electrodes having a gap therebetween, the gap being wider at intersections of the plurality of gate bus lines and the plurality of source bus lines than in areas other than the intersections;

wherein the pixels are rectangular-shaped regions defined by the plurality of gate bus lines and the plurality of source bus lines; each of the pixel electrodes corresponding to the respective pixels has at least one missing portion which corresponds to a corner of the rectangular-shaped region; and said at least one missing portion makes the gap between adjacent ones of the pixel electrodes wider at the intersections;

wherein each of the intersections faces corresponding four of the pixel electrodes, and each of the four pixel electrodes has said at least one missing portion at a corner facing the intersection; and wherein each of the pixel electrodes has a missing portion corresponding to a central area of at least one of sides of corresponding one of the rectangular-shaped regions of the pixels.

3. The OCB mode liquid crystal display device according to claim 1, wherein the pixels are inversion-driven via the respective plurality of switching elements.

4. The OCB mode liquid crystal display device according to claim 1, wherein the liquid crystal molecules have positive dielectric anisotropy.

5. The OCB mode liquid crystal display device according to claim 1, wherein the pixel electrodes overlap the plurality of gate bus lines as seen in plan view.

6. The OCB mode liquid crystal display device according to claim 1, wherein the pixel electrodes overlap the plurality of source bus lines as seen in plan view.

* * * * *